United States Patent
Zhao et al.

(10) Patent No.: US 12,273,662 B2
(45) Date of Patent: Apr. 8, 2025

(54) IMAGE PROCESSING METHOD AND APPARATUS, TERMINAL, AND STORAGE MEDIUM

(71) Applicant: HUAWEI TECHNOLOGIES CO., LTD., Shenzhen (CN)

(72) Inventors: Lin Zhao, Beijing (CN); Tianyu Yao, Tampere (FI); Yuewan Lu, Shenzhen (CN); Hongwei Hu, Beijing (CN); Wenmei Gao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 454 days.

(21) Appl. No.: 17/793,211

(22) PCT Filed: Oct. 31, 2020

(86) PCT No.: PCT/CN2020/125611
§ 371 (c)(1),
(2) Date: Jul. 15, 2022

(87) PCT Pub. No.: WO2021/143284
PCT Pub. Date: Jul. 22, 2021

(65) Prior Publication Data
US 2023/0079582 A1    Mar. 16, 2023

(30) Foreign Application Priority Data

Jan. 15, 2020    (CN) ......................... 202010044246.4

(51) Int. Cl.
*H04N 9/64*    (2023.01)
*G06T 3/40*    (2006.01)
(Continued)

(52) U.S. Cl.
CPC ............... *H04N 9/646* (2013.01); *G06T 3/40* (2013.01); *G06T 5/70* (2024.01); *H04N 9/67* (2013.01);
(Continued)

(58) Field of Classification Search
CPC ............ H04N 9/646; H04N 9/67; H04N 9/77; H04N 23/76; H04N 23/85; H04N 25/134;
(Continued)

(56) References Cited

U.S. PATENT DOCUMENTS 10,171,783 B2 * 1/2019 Wu .......................... G09G 5/04
11,496,715 B2 * 11/2022 Hsu ........................... G06T 5/92
(Continued)

FOREIGN PATENT DOCUMENTS

CN    103578084 A    2/2014
CN    105100550 A    11/2015
(Continued)

OTHER PUBLICATIONS

Chinese Office Action issued in corresponding Chinese Application No. 202010044246.4, dated Nov. 30, 2021, pp. 1-5.
(Continued)

*Primary Examiner* — Gregory A Morse
*Assistant Examiner* — Renae A Bitor
(74) *Attorney, Agent, or Firm* — HAUPTMAN HAM, LLP

(57) ABSTRACT

An image processing method includes: converting a red yellow blue RYB image into a grid image based on a red green blue RGB format; generating a first brightness layer of the grid image, and determining a reference gain compensation array used to adjust the first brightness layer; obtaining, based on a preset compensation array correspondence, a target gain compensation array that is associated with the reference gain compensation array and based on an RYB
(Continued)

format; and adjusting a second brightness layer of the RYB image by using the target gain compensation array, to generate a corrected image.

19 Claims, 14 Drawing Sheets

(51) Int. Cl.
  *G06T 5/70* (2024.01)
  *H04N 9/67* (2023.01)
  *H04N 9/77* (2006.01)
  *H04N 23/76* (2023.01)
(52) U.S. Cl.
  CPC ............... *H04N 9/77* (2013.01); *H04N 23/76* (2023.01); *G06T 2207/10024* (2013.01); *G06T 2207/20021* (2013.01); *G06T 2207/20081* (2013.01)
(58) Field of Classification Search
  CPC ........ H04N 25/61; H04N 25/611; G06T 3/40; G06T 5/70; G06T 2207/10024; G06T 2207/20021; G06T 2207/20081; G06T 5/94; G06T 7/90
  See application file for complete search history.

(56) References Cited

U.S. PATENT DOCUMENTS

| | | |
|---|---|---|
| 2014/0267829 A1 | 9/2014 | McMahon et al. |
| 2016/0171697 A1* | 6/2016 | Paliy ..................... H04N 25/61 348/187 |
| 2017/0078596 A1* | 3/2017 | Chesnokov ............ H04N 9/646 |
| 2018/0122103 A1 | 5/2018 | Chen et al. |
| 2019/0045162 A1* | 2/2019 | Krestyannikov ...... H04N 25/61 |

FOREIGN PATENT DOCUMENTS

| | | |
|---|---|---|
| CN | 103377474 B | 8/2016 |
| CN | 107071233 A | 8/2017 |
| CN | 108881725 A | 11/2018 |
| CN | 108921172 A | 11/2018 |
| CN | 109166176 A | 1/2019 |
| IN | 104587098 A | 5/2015 |
| WO | 2019062633 A1 | 4/2019 |

OTHER PUBLICATIONS

Extended European Search Report issued in corresponding European Application No. 20913573.0, dated Jan. 5, 2023, pp. 1-10.
International Search Report issued in corresponding International Application No. PCT/CN2020/125611, dated Feb. 5, 2021, pp. 1-8.

* cited by examiner

RYB image                    Brightness layer (a)          (b)

IMAGE PROCESSING METHOD AND APPARATUS, TERMINAL, AND STORAGE MEDIUM

CROSS-REFERENCE TO RELATED APPLICATIONS

This application is a National Stage of International Application No. PCT/CN2020/125611, filed on Oct. 31, 2020, which claims priority to Chinese Patent Application No. 202010044246.4, filed on Jan. 15, 2020, both of which are hereby incorporated by reference in their entireties.

TECHNICAL FIELD

This application relates to the field of data processing technologies, and in particular, to an image processing method and apparatus, a terminal, and a storage medium.

BACKGROUND

Red yellow blue RYB image sensors have been widely used because their imaging effects are better than imaging effects of red green blue RGB sensors. To reduce color distortion of an RYYB image sensor in a photographing process, a light filter may be mounted on the RYYB image sensor. However, because the light filter has different transmittances at different angles of incidence, when color distortion of an RYB image is reduced, brightness of the entire image is uneven, and color shading (Color Shading) exists.

SUMMARY

Embodiments of this application provide an image processing method and apparatus, a terminal, and a storage medium, to resolve a problem that color distortion and color shading cannot be simultaneously resolved in an existing RYB format-based image processing technology.

According to a first aspect, an embodiment of this application provides an image processing method, including:
converting a red yellow blue RYB image into a grid image based on a red green blue RGB format;
generating a first brightness layer of the grid image, and determining a reference gain compensation array used to adjust the first brightness layer;
obtaining, based on a preset compensation array correspondence, a target gain compensation array that is associated with the reference gain compensation array and based on an RYB format; and
adjusting a second brightness layer of the RYB image by using the target gain compensation array, to generate a corrected image.

In a possible implementation of the first aspect, before obtaining, based on the preset compensation array correspondence, a second gain compensation array that is associated with a first gain compensation array and based on the RYB format, the method further includes:
obtaining a plurality of training control groups in environments with different brightness, where each training control group includes at least one first training image based on the RYB format and at least one second training image based on the RGB format;
generating a first training compensation array of the first training image, and generating a second training compensation array of the second training image;
using the first training compensation array as an output sample of a backpropagation algorithm network, using the second training compensation array as an input sample of the backpropagation algorithm network, and training the backpropagation algorithm network to obtain a compensation conversion network; and
inputting each reference gain compensation array based on the RGB format to the compensation conversion network, determining a target gain compensation array based on the RYB format and corresponding to each reference gain compensation array, and generating the compensation array correspondence.

In a possible implementation of the first aspect, the converting a red yellow blue RYB image into a grid image based on a red green blue RGB format includes:
dividing the RYB image into a plurality of grid areas, and determining a feature pixel value of each grid area based on a pixel in each grid area;
generating a down-sampled image of the RYB image based on the feature pixel value of each grid area; and
converting, by using the RGB conversion algorithm, the down-sampled image into the grid image based on the RGB format.

In a possible implementation of the first aspect, the converting, by using the RGB conversion algorithm, the down-sampled image into the grid image based on the RGB format includes:
determining, based on a pixel value of each pixel in the RYB image, a light source type used when the RYB image is collected;
selecting the RGB conversion algorithm matching the light source type; and
converting, by using the RGB conversion algorithm, the down-sampled image into the grid image based on the RGB format.

In a possible implementation of the first aspect, the adjusting a second brightness layer of the RYB image by using the target gain compensation array, to generate a corrected image includes:
obtaining an image size of the RYB image;
extending, by using a bilinear interpolation algorithm, the target gain compensation array to an extended gain compensation array having a same size as the image; and
adjusting each brightness value at the second brightness layer by using each compensation coefficient in the extended gain compensation array, to obtain the corrected image.

In a possible implementation of the first aspect, the generating a first brightness layer of the grid image, and determining a reference gain compensation array used to adjust the first brightness layer includes:
obtaining a pixel value of a central grid area of the grid image;
performing normalization processing on each feature pixel value in the grid image based on the pixel value of the central grid area to obtain a normalized pixel value of each grid area;
generating, based on a ratio of an R-channel value to a G-channel value of the normalized pixel value of each grid area, an R/G layer corresponding to the grid image;
generating, based on a ratio of a B-channel value to the G-channel value of the normalized pixel value of each grid area, a B/G layer corresponding to the grid image; and
identifying the R/G layer and the B/G layer as the first brightness layer.

In a possible implementation of the first aspect, the generating a first brightness layer of the grid image, and determining a reference gain compensation array used to adjust the first brightness layer includes:

adjusting the first brightness layer by using each candidate gain compensation array in a gain compensation set, to obtain a brightness calibration layer corresponding to each candidate gain compensation array;

determining a smoothing coefficient of each candidate gain compensation array based on a brightness value of each pixel at the brightness calibration layer; and selecting a candidate gain compensation array with a largest smoothing coefficient as the reference gain compensation array.

According to a second aspect, an embodiment of this application provides an image processing apparatus, including:

a grid image conversion unit, configured to convert a red yellow blue RYB image into a grid image based on a red green blue RGB format;

a reference gain compensation array determining unit, configured to: generate a first brightness layer of the grid image, and determine a reference gain compensation array used to adjust the first brightness layer;

a target gain compensation array obtaining unit, configured to obtain, based on a preset compensation array correspondence, a target gain compensation array that is associated with the reference gain compensation array and based on an RYB format; and an image calibration unit, configured to adjust a second brightness layer of the RYB image by using the target gain compensation array, to generate a corrected image.

According to a third aspect, an embodiment of this application provides a terminal device, including a memory, a processor, and a computer program that is stored in the memory and that can be run on the processor. When executing the computer program, the processor implements the image processing method according to any one of the implementations of the first aspect.

According to a fourth aspect, an embodiment of this application provides a computer-readable storage medium. The computer-readable storage medium stores a computer program, and when the computer program is executed by a processor, the image processing method according to any one of the implementations of the first aspect is implemented.

According to a fifth aspect, an embodiment of this application provides a computer program product. When the computer program product runs on a terminal device, the terminal device is enabled to perform the image processing method according to any one of the implementations of the first aspect.

It may be understood that, for beneficial effects of the second aspect to the fifth aspect, refer to the related description in the first aspect. Details are not described herein again.

Compared with the conventional technology, embodiments of this application have the following beneficial effects.

In embodiments of this application, an RYB image is converted into a grid image that is based on an RGB format and that has a better discrete performance in different light source environments, and a first gain compensation array corresponding to the grid image is generated. Then, a second gain compensation array based on an RYB format is generated by using a preset compensation array correspondence, and the RYB image is adjusted by using the second gain compensation array to generate a corrected image. In this way, color distortion is avoided, and a brightness layer of the RYB image is adjusted by using the second gain compensation array. This eliminates color shading and improves an imaging effect.

DESCRIPTION OF EMBODIMENTS

Figure 1:
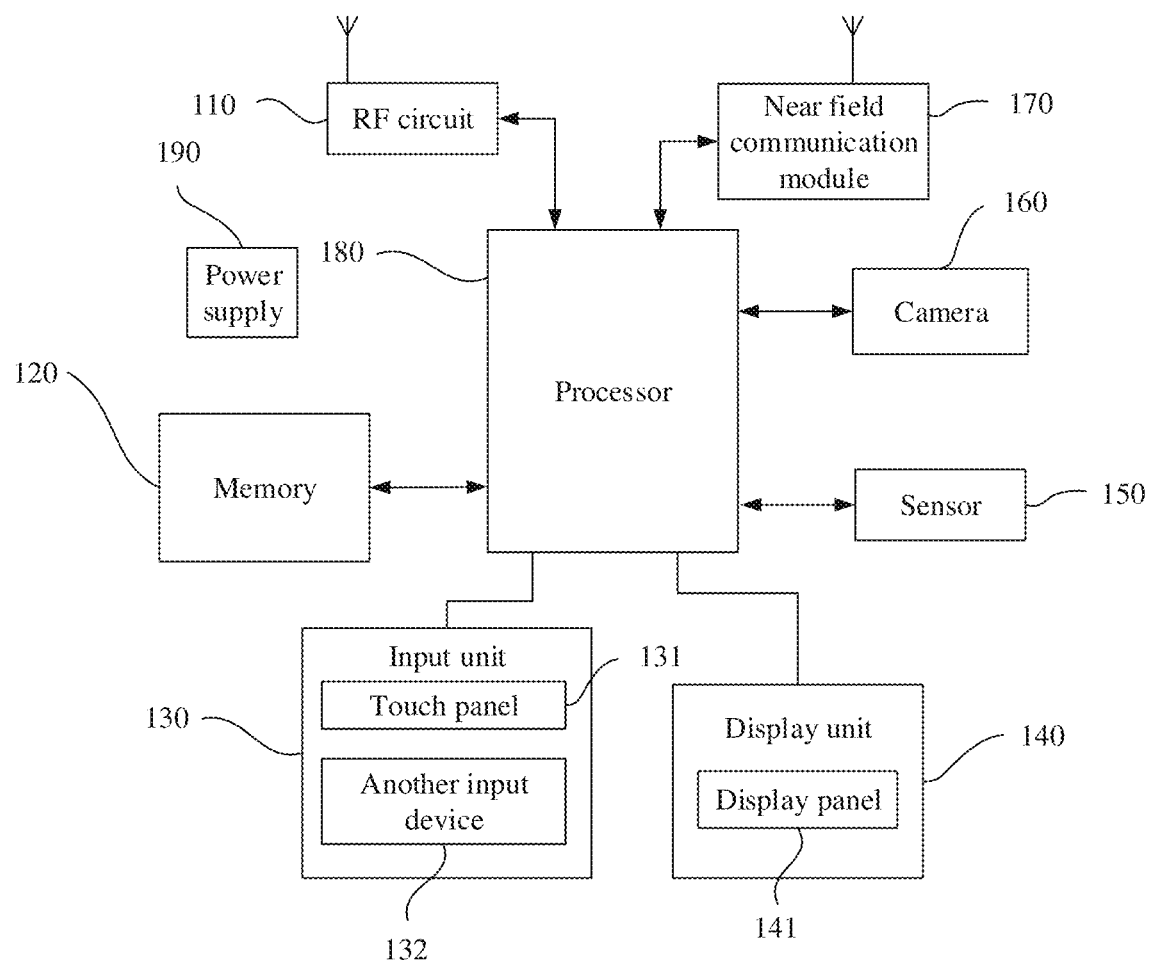
FIG. 1 is a block diagram of a partial structure of a mobile phone according to an embodiment of this application.

In the following description, to illustrate rather than limit, specific details such as a particular system structure, and a technology are provided to make a thorough understanding of embodiments of this application. However, persons skilled in the art should know that this application may also be implemented in other embodiments without these specific details. In other cases, detailed descriptions of well-known systems, apparatuses, circuits, and methods are omitted, so that this application is described without being obscured by unnecessary details.

It should be understood that, when used in the specification and the appended claims of this application, the term "include" indicates presence of the described features, entireties, steps, operations, elements, and/or components, but does not exclude presence or addition of one or more other features, entireties, steps, operations, elements, components, and/or sets thereof.

It should also be understood that the term "and/or" used in the specification and the appended claims of this application refers to any combination and all possible combinations of one or more associated listed items, and includes these combinations.

As used in the specification and the appended claims of this application, according to the context, the term "if" may be interpreted as "when" or "once" or "in response to determining" or "in response to detecting". Similarly, according to the context, the phrase "if it is determined that" or "if (a described condition or event) is detected" may be interpreted as a meaning of "once it is determined that" or "in response to determining" or "once (a described condition or event) is detected" or "in response to detecting (a described condition or event)".

In addition, in the specification and the appended claims of this application, the terms "first", "second", "third", and the like are merely used for distinguishing description, and shall not be understood as an indication or implication of relative importance.

Reference to "an embodiment", "some embodiments", or the like described in the specification of this application indicates that one or more embodiments of this application include a specific feature, structure, or characteristic described with reference to the embodiments. Therefore, in this specification, statements, such as "in an embodiment", "in some embodiments", "in some other embodiments", and "in other embodiments", that appear at different places do not necessarily mean referring to a same embodiment, instead, the statements mean referring to "one or more but not all of the embodiments", unless otherwise specifically emphasized in other ways. Terms "include", "contain", "have", and variants of the terms all mean "include but are not limited to", unless otherwise specifically emphasized in other ways.

An image processing method provided in embodiments of this application may be applied to a terminal device such as a mobile phone, a smart camera, a tablet computer, a wearable device, a vehicle-mounted device, an augmented reality (augmented reality, AR) device/a virtual reality (virtual reality, VR) device, a notebook computer, an ultra-mobile personal computer (ultra-mobile personal computer, UMPC), a netbook, or a personal digital assistant (personal digital assistant, PDA), or may be applied to a database, a server, or a service response system based on terminal artificial intelligence, to respond to an image processing request fed back by another terminal. A specific type of the terminal device is not limited in embodiments of this application.

For example, the terminal device may be a station (STATION, ST) in a WLAN, a cellular phone, a cordless phone, a session initiation protocol (Session Initiation Protocol, SIP) phone, a wireless local loop (Wireless Local Loop, WLL) station, a personal digital assistant (Personal Digital Assistant, PDA) device, a handheld device having a wireless communication function, a computing device or another processing device connected to a wireless modem, a computer, a laptop computer, a handheld communication device, a handheld computing device, and/or another device for communicating in a wireless system and a next-generation communication system, for example, a mobile terminal in a 5G network or a mobile terminal in a future evolved public land mobile network (Public Land Mobile Network, PLMN).

As an example instead of a limitation, when the terminal device is a wearable device, the wearable device may alternatively be a generic term for wearable devices that are developed based on intelligent design of daily wearing by using wearable technologies, for example, glasses, gloves, watches, clothes, and shoes that have a photographing function. The wearable device is a portable device that is directly worn on a body or integrated into clothes or an accessory of a user, The wearable device is attached to the body of the user, and is configured to: record an image in a moving process of the user, collect an environmental image according to a photographing instruction initiated by the user, or the like. The wearable device is more than a hardware device. The wearable device implements powerful functions through software support, data exchange, and cloud interaction. Generalized wearable intelligent devices include full-featured and large-size devices that can implement complete or partial functions without depending on smartphones, for example, smart watches or smart glasses, and devices that focus on only one type of application and need to work with other devices such as smartphones, for example, various smart watches or smart glasses for image collection.

For example, the terminal device is a mobile phone. FIG. 1 is a block diagram of a partial structure of a mobile phone according to an embodiment of this application. Refer to FIG. 1. The mobile phone includes components such as a radio frequency (Radio Frequency, RF) circuit 110, a memory 120, an input unit 130, a display unit 140, a sensor 150, an audio circuit 160, a near field communication module 170, a processor 180, and a power supply 190. Persons skilled in the art may understand that a structure of the mobile phone shown in FIG. 1 does not constitute a limitation on the mobile phone. The mobile phone may include more or fewer components than those shown in the figure, or combine some components, or have different component arrangements.

The following describes each component of the mobile phone in detail with reference to FIG. 1.

The RF circuit 110 may be configured to receive and send a signal in an information receiving or sending process or a call process. Particularly, after receiving downlink information from a base station, the RF circuit 110 sends the downlink information to the processor 180 for processing, and in addition, sends designed uplink data to the base station. Usually, an RF circuit includes but is not limited to an antenna, at least one amplifier, a transceiver, a coupler, a low noise amplifier (Low Noise Amplifier, LNA), a duplexer, and the like. In addition, the RF circuit 110 may further communicate with a network and another device through wireless communication. The foregoing wireless communication may use any communication standard or protocol, including but not limited to a global system for mobile communications (Global System of Mobile communication, GSM), a general packet radio service (general packet radio service, GPRS), code division multiple access (code division multiple access, CDMA), wideband code division multiple access (wideband code division multiple access, WCDMA), long term evolution (long term evolution, LTE), an email, a short messaging service (short messaging service, SMS), and the like. The RF circuit 110 is used to receive an image obtained by another terminal, and the obtained image is processed to output a corresponding corrected image.

The memory 120 may be configured to store a software program and a module. The processor 180 runs the software program and the module that are stored in the memory 120, to implement various function applications and data processing of the mobile phone. For example, a preset compensation array correspondence is stored in the memory 120. The memory 120 may mainly include a program storage area and a data storage area. The program storage area may store an operating system, an application required by at least one function (for example, a sound playing function or an image playing function), and the like. The data storage area may store data (for example, audio data or an address book) and the like created based on use of the mobile phone. In addition, the memory 120 may include a high-speed random access memory, or may include a nonvolatile memory, such as at least one magnetic disk storage device, a flash memory device, or another volatile solid-state storage device.

The input unit 130 may be configured to: receive entered digital or character information, and generate key signal input related to a user setting and function control of the mobile phone 100. Specifically, the input unit 130 may include a touch panel 131 and another input device 132. The touch panel 131, also referred to as a touchscreen, may collect a touch operation of a user on or near the touch panel 131 (such as an operation of the user on or near the touch panel 131 by using any suitable object or attachment, such as a finger or a touch pen), and drive a corresponding connection apparatus according to a preset program.

The display unit 140 may be configured to display information entered by the user or information provided for the user, and various menus of the mobile phone, for example, output an adjusted corrected image. The display unit 140 may include a display panel 141. Optionally, the display panel 141 may be configured by using a liquid crystal display (Liquid Crystal Display, LCD), an organic light-emitting diode (Organic Light-Emitting Diode, OLED), or the like. Further, the touch panel 131 may cover the display panel 141. When detecting the touch operation on or near the touch panel 131, the touch panel 131 transfers the touch operation to the processor 180 to determine a type of a touch event, and then the processor 180 provides a corresponding visual output on the display panel 141 based on the type of the touch event. In FIG. 1, the touch panel 131 and the display panel 141 are used as two independent components to implement input and input functions of the mobile phone. However, in some embodiments, the touch panel 131 and the display panel 141 may be integrated to implement the input and output functions of the mobile phone.

The mobile phone 100 may further include at least one type of sensor 150, for example, a light sensor, a motion sensor, and another sensor. Specifically, the light sensor may include an ambient light sensor and a proximity sensor. The ambient light sensor may adjust brightness of the display panel 141 based on brightness of ambient light, and the proximity sensor may turn off the display panel 141 and/or backlight when the mobile phone approaches an ear. As a type of movement sensor, an accelerometer sensor may detect a value of acceleration in each direction (usually on three axes), may detect a value and a direction of gravity in a stationary state, and may be used in an application for identifying a mobile phone posture (such as screen switching between a landscape mode and a portrait mode, a related game, or magnetometer posture calibration), a function related to vibration identification (such as a pedometer or a knock), or the like. Other sensors such as a gyroscope, a barometer, a hygrometer, a thermometer, or an infrared sensor may be further configured in the mobile phone. Details are not described herein.

The mobile phone 100 may further include a camera 160. Optionally, a position of the camera on the mobile phone 100 may be front-facing or rear-facing. This is not limited in this embodiment of this application.

Optionally, the mobile phone 100 may include a single camera, dual-camera, triple-lens camera, or the like. This is not limited in this embodiment of this application.

For example, the mobile phone 100 may include a triple-lens camera, where one is a primary camera, one is a wide-angle camera, and one is a long-focus camera.

Optionally, when the mobile phone 100 includes a plurality of cameras, the plurality of cameras may be all front-facing, or all rear-facing, or some front-facing and some rear-facing. This is not limited in this embodiment of this application.

The terminal device may receive, by using the near field communication module 170, a to-be-processed image sent by another device. For example, the near field communication module 170 is integrated with a Bluetooth communication module, establishes a communication connection to a smart camera by using the Bluetooth communication module, and receives a to-be-processed image fed back by the smart camera. Although FIG. 1 shows the near field communication module 170, it may be understood that the near field communication module 170 is not a mandatory component of the mobile phone 100, and the near field communication module 170 may be omitted as required, provided that the scope of the essence of this application is not changed.

The processor 180 is a control center of the mobile phone, and uses various interfaces and lines to connect all parts of the entire mobile phone. By running or executing the software program and/or the module that are/is stored in the memory 120 and invoking data stored in the memory 120, the processor 180 executes various functions and data processing of the mobile phone, so as to perform overall monitoring on the mobile phone. Optionally, the processor 180 may include one or more processing units. Preferably, the processor 180 may integrate an application processor and a modem processor. The application processor mainly processes an operating system, a user interface, an application, and the like. The modem processor mainly processes wireless communication. It may be understood that the foregoing modem processor may be not integrated into the processor 180.

The mobile phone 100 further includes the power supply 190 (for example, a battery) supplying power to the components. Preferably, the power supply may be logically connected to the processor 180 by using a power management system, to implement functions such as charging and discharging management and power consumption management by using the power management system.

The mobile phone 100 further includes an audio circuit and a speaker. A microphone may provide an audio interface between the user and the mobile phone. The audio circuit may convert received audio data into an electrical signal and transmit the electrical signal to the speaker. The speaker converts the electrical signal into a sound signal for output. In addition, the microphone converts a collected sound signal into an electrical signal. The audio circuit receives the electrical signal, converts the electrical signal into audio data, and then outputs the audio data to the processor 180. The processor 180 processes the audio data and then sends the processed audio data to, for example, another mobile phone through the RF circuit 110, or outputs the processed audio data to the memory 120 for further processing. For example, the user may collect a voice signal of the user by using the audio circuit, control, based on the voice signal, the camera 160 to collect an image, and process a collected image to obtain a corrected image.

Figure 2:
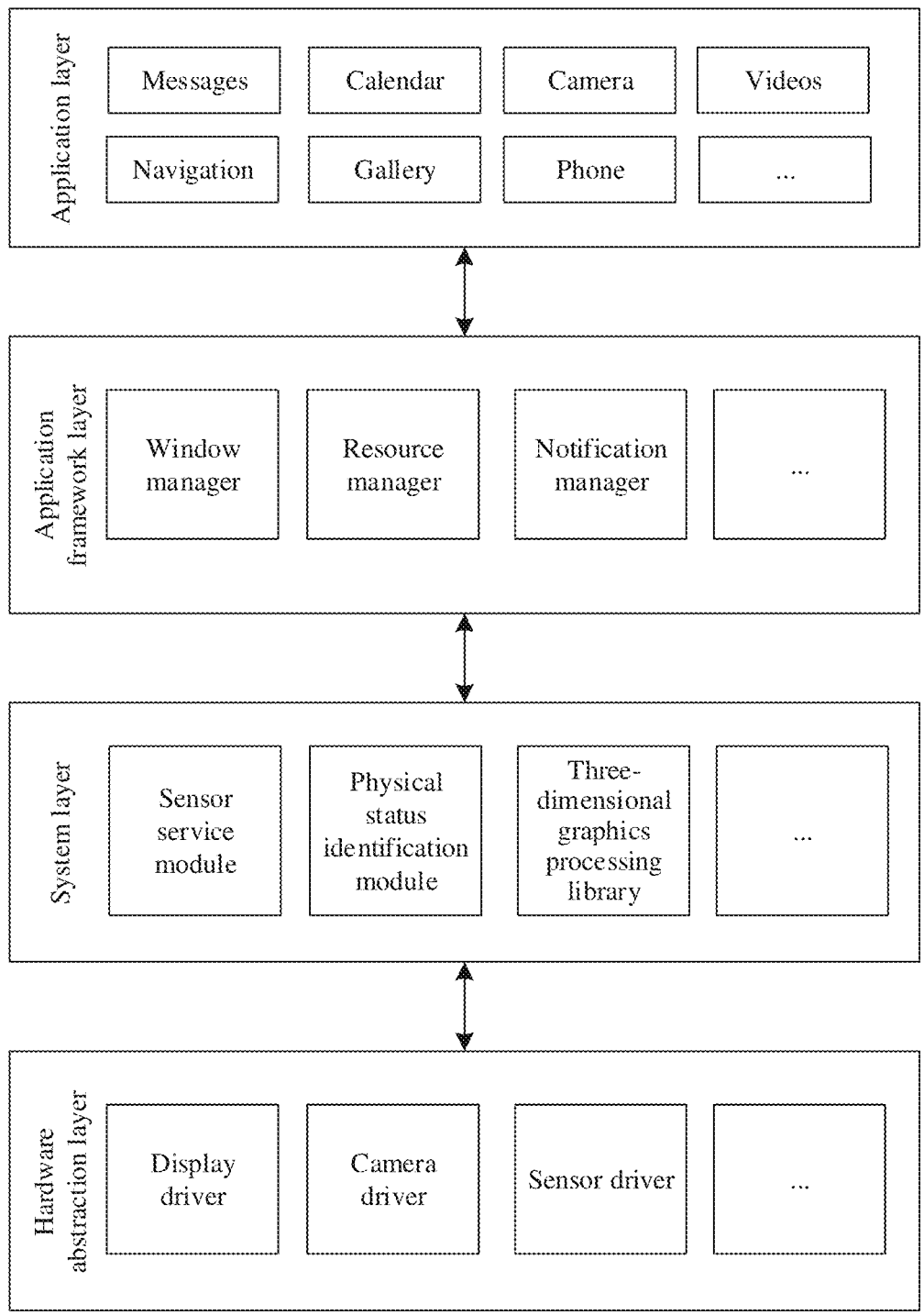
FIG. 2 is a schematic diagram of a software structure of a mobile phone according to an embodiment of this application.

FIG. 2 is a schematic diagram of a software structure of the mobile phone 100 according to an embodiment of this application. For example, an operating system of the mobile phone 100 is an Android system. In some embodiments, the Android system is divided into four layers: an application layer, an application framework layer (framework, FWK), a system layer, and a hardware abstraction layer. The layers communicate with each other through a software interface.

As shown in FIG. 2, the application layer may include a series of application packages, and the application packages may include applications such as Messages, Calendar, Camera, Videos, Navigation, Gallery, and Phone. In particular, a speech recognition algorithm may be embedded into an application, an image processing procedure is started by using a related control in the application, and an obtained RYB image is processed to obtain a corrected image without color shading.

The application framework layer provides an application programming interface (application programming interface, API) and a programming framework for an application at the application layer. The application framework layer may include some predefined functions, such as a function for receiving an event sent by the application framework layer.

As shown in FIG. 2, the application framework layer may include a window manager, a resource manager, a notification manager, and the like.

The window manager is configured to manage a window program. The window manager may obtain a size of a display, determine whether there is a status bar, perform screen locking, take a screenshot, and the like. The content provider is configured to store and obtain data, and enable the data to be accessed by an application. The data may include a video, an image, audio, calls that are made and received, a browsing history and bookmarks, a phone book, and the like.

The resource manager provides, for an application, various resources such as a localized character string, an icon, an image, a layout file, and a video file.

The notification manager enables an application to display notification information in the status bar, and may be configured to convey a notification message. The notification manager may automatically disappear after a short pause without requiring a user interaction. For example, the notification manager is configured to notify download completion, give a message notification, and the like. The notification manager may be a notification that appears in a top status bar of the system in a form of a graph or a scroll bar text, for example, a notification of an application running on the background, or may be a notification that appears on the screen in a form of a dialog window. For example, text information is prompted in the status bar, a prompt tone is produced, the electronic device vibrates, or the indicator light blinks.

The application framework layer may further include:
a view system, where the view system includes visual controls such as a control for displaying a text and a control for displaying an image. The view system may be configured to construct an application. A display interface may include one or more views. For example, a display interface including an SMS notification icon may include a text display view and an image display view.

The phone manager is configured to provide a communication function of the mobile phone 100, for example, management of call statuses (including answering, declining, and the like).

The system layer may include a plurality of function modules, for example, a sensor service module, a physical status identification module, and a three-dimensional graphics processing library (for example, OpenGL ES).

The sensor service module is configured to monitor sensor data uploaded by various types of sensors at a hardware layer, to determine a physical status of the mobile phone 100.

The physical status identification module is configured to: analyze and identify a user gesture, a face, and the like.

The three-dimensional graphics processing library is configured to implement three-dimensional graphics drawing, image rendering, compositing, layer processing, and the like.

The system layer may further include:
The surface manager is configured to manage a display subsystem and provide fusion of 2D and 3D layers for a plurality of applications.

The media library supports a plurality of commonly used static image files, video playback and recording, and audio. The media library may support a plurality of audio and video coding formats, for example, MPEG-4, H.264, MP3, AAC, AMR, JPG, and PNG.

The hardware abstraction layer is a layer between hardware and software. The hardware abstraction layer may include a display driver, a camera driver, a sensor driver, a microphone driver, and the like, and is configured to drive related hardware at the hardware layer, for example, a display, a camera, a sensor, and a microphone. In particular, a photographing module is started by using the camera driver. The photographing module is specifically a photographing module based on an RYYB image sensor. The RYYB image sensor collects light information corresponding to a time point when a photographing instruction is triggered, to generate an RYB image.

It should be noted that the image processing method provided in this embodiment of this application may be performed at any one of the foregoing levels. This is not limited herein.

Figure 3:
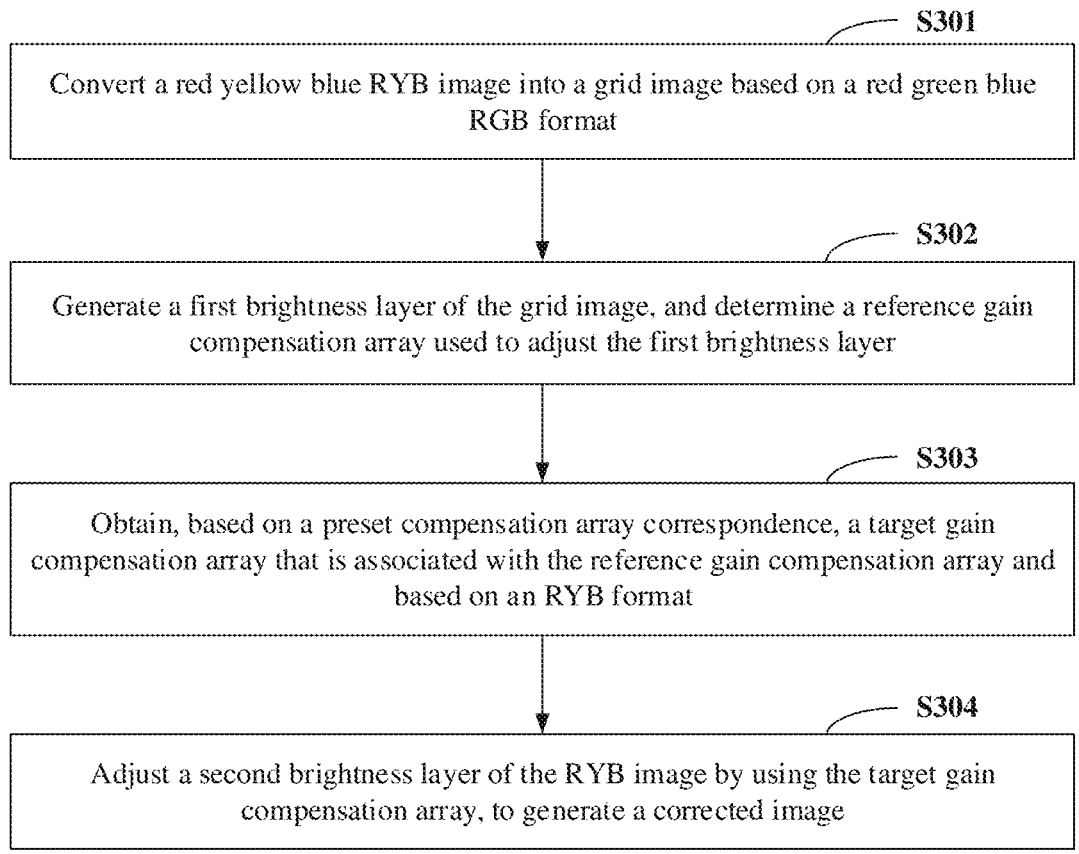
FIG. 3 is an implementation flowchart of an image processing method according to a first embodiment of this application.

In this embodiment of this application, a procedure is executed by a device on which an image processing program is installed. As an example instead of a limitation, the device with the image processing program may be specifically a terminal device. The terminal device may be a smartphone, a smart camera, a tablet computer, or the like used by a user, processes an obtained RYB image, and generates an adjusted corrected image, to eliminate color shading introduced in a process of collecting the RYB image, and improve an imaging effect. FIG. 3 is an implementation flowchart of an image processing method according to a first embodiment of this application. Details are as follows:

S301: Convert a red yellow blue RYB image into a grid image based on a red green blue RGB format.

In this embodiment, a terminal device may obtain an RYB image by using a built-in photographing module that is based on an RYB imaging principle. In this case, a user may activate the photographing module by starting a specific application in the terminal device, for example, a camera application or a real-time video call application. The user may further activate the photographing module by tapping some controls in a current application. For example, the user taps a photo sending control in a social application, and sends the collected RYB image to a communication peer end as interaction information. In this case, the terminal device collects, by using the photographing module, an environmental image when the user performs a tapping operation, and uses the environmental image as the foregoing to-be-adjusted RYB image. The terminal device may further collect the to-be-adjusted RYB image by using an external photographing module. In this case, the terminal device may establish a communication connection with the external photographing module through a wireless communication module, a serial interface, or the like. The user may control, by tapping a switch on the photographing module, the photographing module to collect an image, generate a corresponding RYB image by using a built-in RYB image sensor, and transmit the RYB image to the terminal device by using the established communication connection. After receiving the RYB image fed back by the photographing module, the terminal device may perform a subsequent image processing procedure.

In a possible implementation, in addition to obtaining the to-be-processed RYB image by using the built-in or external photographing module, the terminal device may further obtain the to-be-processed RYB image in a manner of sending by the communication peer end. The terminal device may establish a communication connection to the communication peer end by using a communication module, and receive, by using the communication connection, an RYB image sent by the communication peer end. For a manner in which the communication peer end collects the RYB image, refer to the foregoing process. Details are not described herein again. After receiving the RYB image fed back by the communication peer end, the terminal device may eliminate color shading of the RYB image. In a possible implementation, the terminal device may be a cloud server. A client program corresponding to the cloud server may be installed on each communication peer end, or an application interface corresponding to the cloud server is locally generated at the communication peer end through an API interface, and a locally obtained RYB image is sent to the cloud server through the client program or the API interface. The cloud server feeds back a corrected image obtained after processing to the communication peer end. After receiving the processed RYB image, that is, the foregoing corrected image, the communication peer end may output the corrected image on a display module of the communication peer end, and store the corrected image after receiving a photographing completion instruction.

In a possible implementation, the photographing module used when the terminal device collects the RYB image is generated based on an RYYB image sensor. The RYYB image sensor includes four color channels: an R-channel sensor for collecting red light, a B-channel sensor for collecting blue light, and two Y-channel sensors for collecting yellow light. An originally generated image has four different color channels, that is, the generated image is an RYYB image. The terminal device may convert the RYYB image into the RYB image. An implementation process may be: calculating an average value of pixel values that are of each pixel in the RYYB image and that correspond to two different Y channels, and using the average value as a pixel value of a Y channel of the merged RYB image, where pixel values of the red channel and the blue channel remain unchanged, so as to convert the RYYB image into the RYB image.

Figure 4:
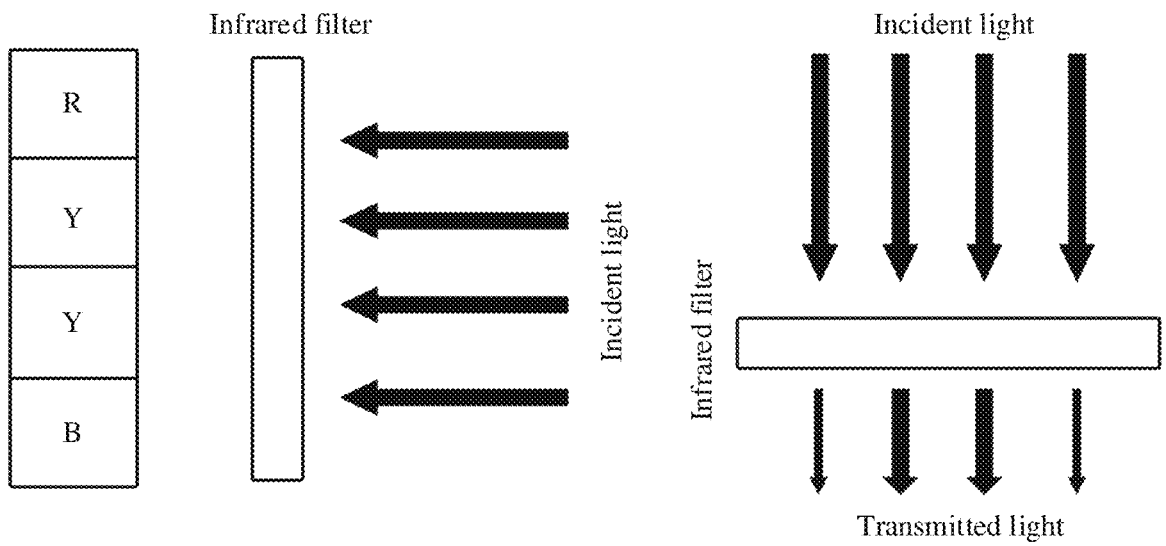
FIG. 4 is a schematic diagram of imaging based on an RYYB image sensor according to an embodiment of this application.

For example, FIG. 4 is a schematic diagram of imaging based on an RYYB image sensor according to an embodiment of this application. Refer to FIG. 4. The RYYB image sensor includes sensors of four channels, which are respectively an R-channel sensor, a B-channel sensor, and two Y-channel sensors. An infrared filter is configured in an optical path between incident light and the RYYB image sensor. Because a photosensitive element in the RYYB image sensor performs imaging based on a complementary metal oxide semiconductor (Complementary Metal Oxide Semiconductor, CMOS) sensor, and the CMOS sensor is relatively sensitive to infrared radiation, color distortion easily occurs. To reduce a color cast caused by sensitivity to red light, an infrared filter can be installed in an incident optical path. However, there is incident light in a plurality of directions when an image is photographed, and different incident light and the infrared filter have different angles of incidence, which affects transmittances of light at different angles of incidence. Consequently, a transmittance of red light in a central area of the image is high, and a transmittance of red light in a boundary area of the image is low, resulting in a red cast in the central area of the image and uneven color space distribution.

Figure 5:
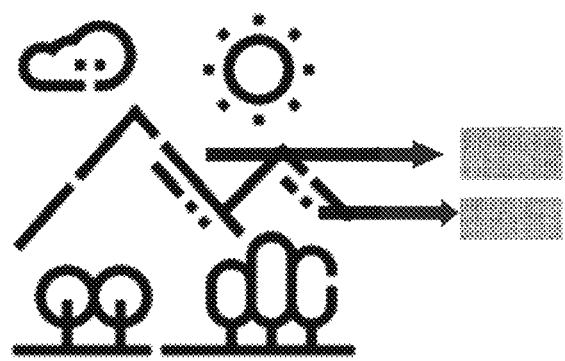
FIG. 5 is a schematic diagram of an RYB image photographed by using a photographing module on which an infrared filter is installed according to an embodiment of this application.
Figure 5:
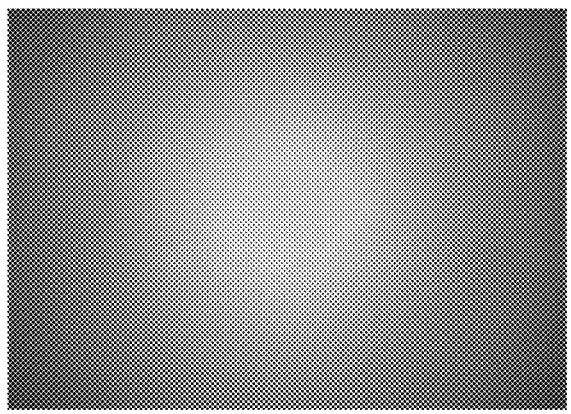

For example, FIG. 5 is a schematic diagram of an RYB image photographed by using a photographing module on which an infrared filter is installed according to an embodiment of this application. Refer to FIG. 5. It may be determined that when the photographing module on which the infrared filter is installed photographs objects of a same type, pixel distribution of an image varies in different areas of the image. A corresponding brightness layer is generated based on the photographed RYB image, and it may be determined that a brightness value of a central area of the brightness layer is relatively high, and a brightness value of a boundary area is relatively low. Consequently, color shading occurs, thereby reducing an imaging effect. The foregoing color shading is particularly clear in a scenario in which a large quantity of areas with a same color are photographed, for example, an indoor wall, an outdoor bridge, an incandescent lamp, a purple flower field, or an image in which the foregoing scenario is used as a background is photographed. Therefore, to eliminate the foregoing distortion caused by the infrared filter when the RYB image is photographed, adjustment may be performed by using S301 to S304, to obtain an adjusted corrected image.

In this embodiment, because yellow light is obtained by superimposing red light and green light, after the RYB image is obtained, a pixel value of each pixel on a G channel may be determined based on a pixel value of each pixel on an R channel and a pixel value of each pixel on a Y channel, so that the RYB image is converted into a corresponding RGB image.

In a possible implementation, a terminal device may obtain, through calculation by using the following algorithm, a pixel value of the G channel after each pixel in the RYB image is converted into the RGB image: $G=(2Y-R)$, where G indicates the pixel value of the G channel, Y indicates a pixel value of the Y channel before conversion, and R indicates a pixel value of the R channel before conversion.

In a possible implementation, the terminal device may be configured with a conversion algorithm corresponding to an RYB image sensor. The terminal device may obtain a device model of the RYB image sensor, download a corresponding conversion algorithm based on the device model, and convert the RYB image into the RGB image based on the obtained conversion algorithm.

In this embodiment, color shading is related to a location area in which a pixel is located, that is, an adjustment coefficient has a strong correlation with the location area. To reduce a calculation amount of subsequent operations, down-sampling may be performed on the RGB image obtained through conversion, the RGB image is divided into a plurality of grid areas, and a feature pixel corresponding to each grid area is obtained, to generate the foregoing grid image based on the RGB format.

For example, if an image size of an RYB image is 3100*2100, that is, each row includes 3100 pixels, and each column includes 2100 pixels, and an image size of the RGB image obtained through conversion is consistent with the image size of the RYB image, and may also be 3100*2100, a 31*21 grid may be obtained through down-sampling, that is, each grid includes 100*100 pixels, and the foregoing pixels are represented by using a feature pixel value. In this way, a 31*21 grid image is obtained through down-sampling.

S302: Generate a first brightness layer of the grid image, and determine a reference gain compensation array used to adjust the first brightness layer.

In this embodiment, after obtaining the grid image that is based on the RGB format and corresponding to the RYB image, the terminal device may generate the first brightness layer corresponding to the grid image. The first brightness layer is specifically used to represent a brightness value of each grid area in the grid image, and the brightness value is irrelevant to chrominance of a feature pixel value corresponding to the grid area. In a possible implementation, the foregoing first brightness layer may be a V layer in a hue saturation value (Hue, Saturation, Value, HSV) format, or may be an illumination (L) layer in a Lab color format, or may be an R/G layer and a B/G layer after the grid image is normalized. A representation manner of the first brightness layer is not limited herein.

In a possible implementation, a manner of generating the first brightness layer may be: because the grid image is an image generated based on the RGB format, that is, a feature pixel value corresponding to each grid area in the grid image includes pixel values of three RGB channels, the terminal device may map the pixel values corresponding to the three RGB channels of each grid area in the grid image to an HSV channel by using a conversion algorithm between RGB and HSV, use three HSV channels to represent the feature pixel value of each grid area, and combine pixel values of the grid areas on a V channel, to generate the foregoing first brightness layer.

In a possible implementation, a manner of generating the first brightness layer may be: because the grid image is an image generated based on the RGB format, that is, a feature pixel value corresponding to each grid area in the grid image includes pixel values of three RGB channels, the terminal device may map, by using an RGB-Lab conversion algorithm (where an image in the Lab format includes an L channel, an a channel, and a b channel; the L channel is a channel used to indicate pixel illumination; the a channel is a channel used to indicate red to green; and the b channel is a channel used to indicate blue to yellow), the pixel values corresponding to the three RGB channels of each grid area in the grid image to Lab channels, use the three Lab channels to represent a feature pixel value of each grid area, and combine pixel values of the grid areas on the L channel, to generate the foregoing first brightness layer.

In this embodiment, because the infrared filter is installed on the photographing module, and transmittances of incident light at different angles are different, brightness of a middle area is higher than brightness of peripheral boundaries. Therefore, brightness values of grid areas at the first brightness layer are different, and in a case in which there is no color shading, brightness values corresponding to the grid areas should be the same. Based on this, the terminal device may adjust each brightness value at the first brightness layer by using a preset reference gain compensation array, so that the brightness values tend to be the same, to eliminate color shading.

Figure 6:
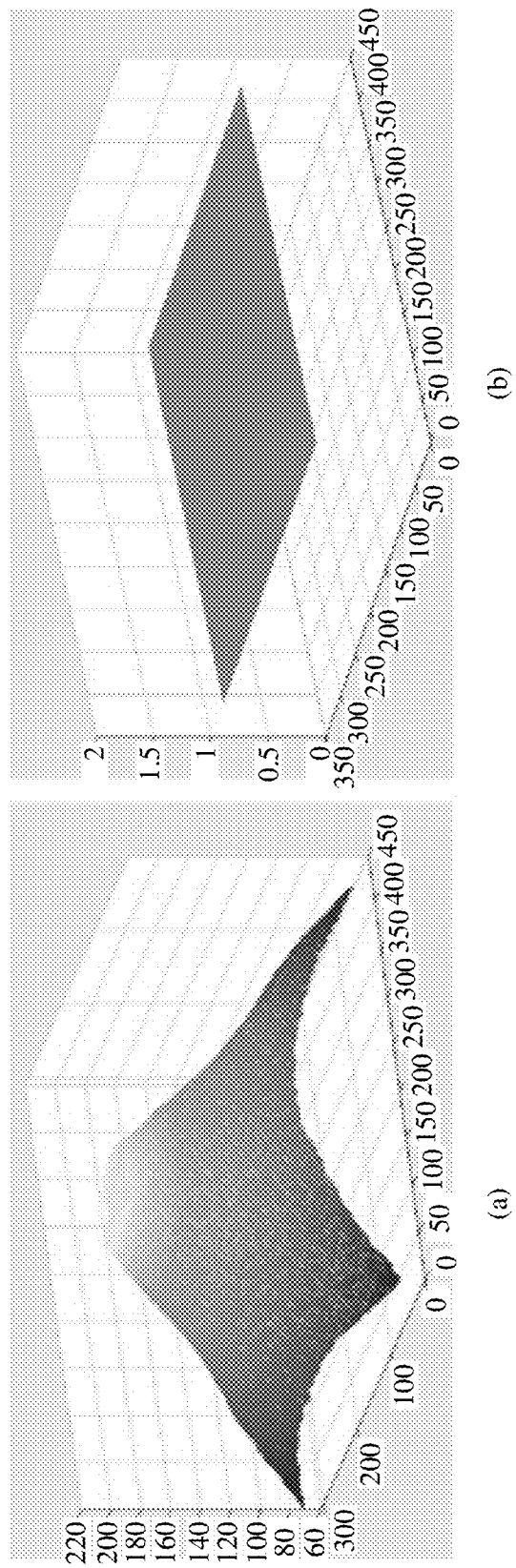
FIG. 6 is a schematic diagram of a curved surface of a first brightness image according to an embodiment of this application.

For example, FIG. 6 is a schematic diagram of a curved surface of a first brightness image according to an embodiment of this application. Refer to FIG. 6. (a) in FIG. 6 is a first brightness image that is obtained before adjustment by using a reference gain compensation array. Due to a case of color shading, a brightness value of a central area of the image is relatively high, and brightness values of peripherals are relatively low. However, when there is no color shading, a three-dimensional curved surface corresponding to the first brightness layer approaches a plane. Therefore, a terminal device may adjust each brightness value in the first brightness image by using the reference gain compensation array, so that an adjusted three-dimensional curved surface of the first brightness layer is a plane. (b) in FIG. 6 is the first brightness image adjusted by using the reference gain compensation array.

In a possible implementation, the terminal device may be configured with a plurality of preset candidate gain compensation arrays, to adjust the first brightness layer by using each candidate gain array, identify a standard deviation between brightness values of grid areas at the adjusted first brightness layer, and select a candidate gain compensation array with a minimum standard deviation value as the foregoing reference gain compensation array. An objective of the adjustment is to make the three-dimensional curved surface corresponding to the first brightness layer approach a plane. Therefore, a standard deviation between brightness values of the adjusted grid areas should be relatively small. In an ideal case, the standard deviation is 0. Therefore, the terminal device may calculate a standard deviation between brightness values at the first brightness layer that are adjusted by using each candidate gain compensation array, and select a candidate gain compensation array with a minimum standard deviation as the reference gain compensation array.

In a possible implementation, the terminal device may import the first brightness layer into a preset gain array selection network, and output a reference compensation gain array matching the first brightness layer. The gain array selection network may be built based on a shallow neural network, or may be built based on a model such as a vector machine, a random forest, or reinforcement learning. Optionally, the terminal device may collect a training image under different light source types and light intensities by using an RGB image sensor. The light source types include but are not limited to: A, D50, D65, D75, H, TL83, TL84, and U30, and the light intensities include but are not limited to: 1000 lux, 700 lux, 300 lux, 100 lux, and 20 lux. Therefore, M*N photographing scenarios may be obtained by combining different light source types and different light intensities, where M is a quantity of light source types, and N is a quantity of light intensities. A plurality of different training images are collected in different photographing scenarios, and corresponding training gain compensation arrays are configured for training brightness layers of the different training images. The training brightness layer is used as an input of the gain array selection network, and the training gain compensation array is used as an output of the gain array selection network, to train and learn the gain array selection network, so as to generate the foregoing gain array selection network.

It should be noted that, if the first brightness layer represents brightness information of an RGB grid image by using two or more layers, a quantity of obtained reference gain compensation arrays matches a quantity of layers. For example, if the first brightness layer of the grid image includes an R/G layer and a B/G layer, a corresponding reference gain compensation array may be configured for the R/G layer and a corresponding reference gain compensation array may be configured for the B/G layer, there may also be a plurality of target compensation arrays obtained subsequently, and an R/Y layer and a B/Y layer are separately adjusted by using an obtained target gain compensation array.

S303: Obtain, based on a preset compensation array correspondence, a target gain compensation array that is associated with the reference gain compensation array and based on an RYB format.

In this embodiment, because the foregoing reference gain compensation array is a gain compensation array based on the RGB format, that is, three channels in the RGB image can be adjusted, and an originally photographed image is photographed based on the RYB image sensor, the reference gain compensation array needs to be mapped to a target gain compensation array based on the RYB format, so as to adjust brightness values of the three RYB channels in the original RYB image.

Figure 7:
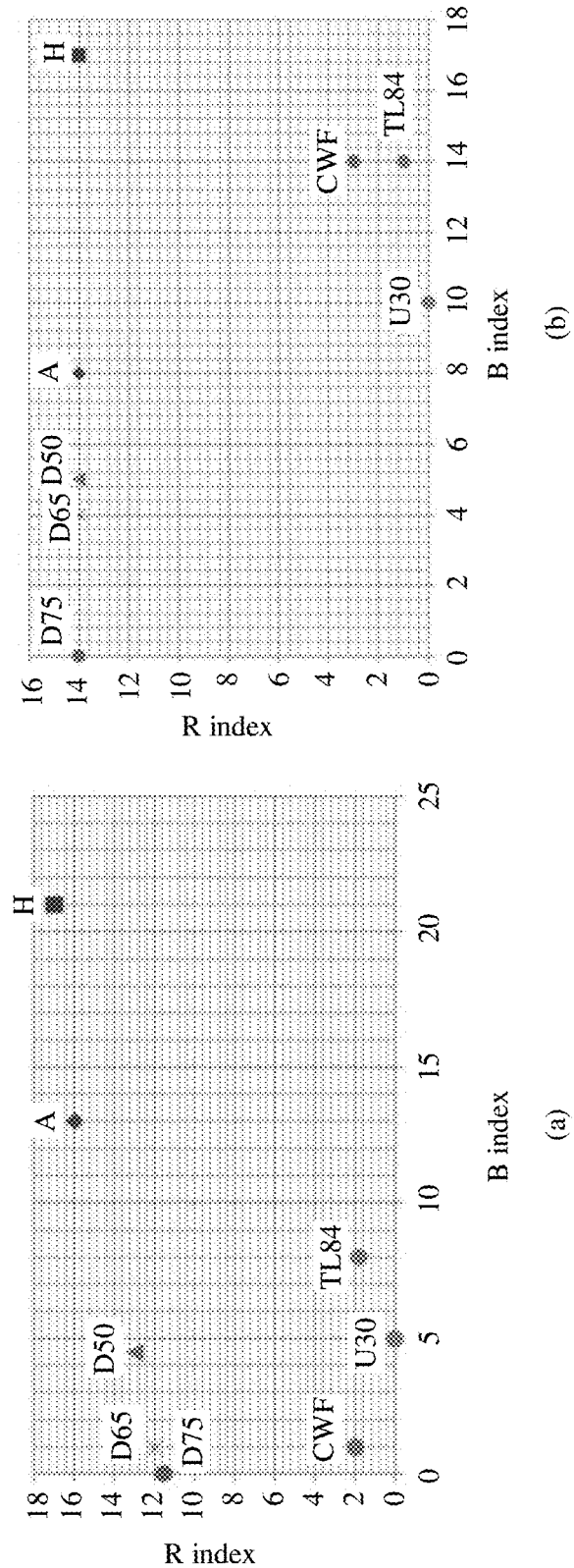
FIG. 7 is a schematic diagram of comparison of light source coordinates in an RGB image and light source coordinates in an RYB image for different light source types according to an embodiment of this application.

In this embodiment, a reason why a corresponding reference gain compensation array is obtained by using a grid image based on an RGB format is that, compared with an RYB image, an RGB image has a relatively large degree of dispersion of different light sources at a brightness layer. FIG. 7 is a schematic diagram of comparison of light source coordinates in an RGB image and light source coordinates in an RYB image for different light source types according to an embodiment of this application. The light source coordinates specifically refer to a brightness value of a central area at a brightness layer of an RGB image. For the RGB image, the brightness layer may be represented by using a normalized R/G layer and a normalized B/G layer. Therefore, brightness values of center coordinate points of the foregoing two layers (for the R/G layer, that is, a first ratio of a pixel value of an R channel to a pixel value of a G channel after the center coordinate point is normalized, namely, an R index in the figure; for the B/G layer, that is, a second ratio of a pixel value of a B channel to a pixel value of a G channel after the center coordinate point is normalized, namely, a B index in the figure) may be used to uniquely determine a coordinate point, that is, light source coordinates of a light source type corresponding to the RGB image in a preset coordinate system. Correspondingly, for the RYB image, an R/Y layer and a B/Y layer may be used as a brightness layer of the RYB image, so as to determine an R index and a B index of the RYB image. Refer to FIG. 7. Light source coordinates of eight light sources A, D50, D65, D75, H, TL83, TL84, and U30 are separately used as examples for description. (a) in FIG. 7 is a diagram of distribution of light source coordinates of an RGB image, and (b) in FIG. 7 is a diagram of distribution of light source coordinates of an RYB image. It can be learned that, in the RGB image, a coordinate distance between light source coordinates of different light sources is relatively large, a dispersion degree is relatively high, that is, different light source types are relatively easy to be distinguished, and differences between different light source types at a brightness layer in an RGB format are relatively large, so that subsequent recognition accuracy is relatively high. However, in the RYB image, a distance between light source coordinates of different light sources is relatively small, a dispersion degree is relatively low (R index values of the five light sources H, A, D65, D75, and D50 are almost the same), that is, different light source types are relatively difficult to be distinguished, and differences between different light source types at a brightness layer in an RYB format are relatively small, so that subsequent recognition accuracy is relatively low. In addition, to improve accuracy of the obtained reference gain compensation array, the RYB image may be first converted into the RGB image with a relatively large brightness difference, and a target gain compensation array based on the RYB format is obtained based on the reference gain compensation array and compensation array correspondences of images in different formats, so that accuracy of obtaining the target gain compensation array can be improved, and an image correction effect is improved.

In this embodiment, the terminal device prestores a compensation array correspondence, and the compensation array correspondence specifically records a correspondence between each reference gain compensation array in the RGB format and each target gain compensation array in the RYB format. After obtaining the reference gain compensation array based on the RGB format, the terminal device may search the foregoing compensation array correspondence to obtain the target gain compensation array corresponding to the foregoing reference gain compensation array.

In a possible implementation, a quantity of reference gain compensation arrays is fixed, and the reference gain compensation arrays are separately used to adjust RGB images photographed in different illumination scenarios. Similarly, a quantity of target gain compensation arrays may also be fixed, and the target gain compensation arrays are separately used to adjust RYB images photographed in different illumination scenarios. Therefore, the terminal device may establish the compensation array correspondence between the reference gain compensation array and the target gain compensation array based on an association relationship between illumination scenarios. For example, for an illumination scenario A, which is a reference gain compensation array A in the RGB format and a target gain compensation array B in the RYB format, an association relationship between the reference gain compensation array A and the target gain compensation array B may be established, and a corresponding illumination scenario may be marked. In this case, the terminal device may identify an illumination type of the RGB image based on the reference gain compensation array, and search the compensation array correspondence for a matched target gain compensation array based on the illumination type.

In a possible implementation, the terminal device may construct the foregoing compensation array correspondence by using a machine learning algorithm. In this case, the terminal device may create a plurality of training samples, where each training sample corresponds to a sample image and belongs to a first training image based on the RGB format and the second training image based on the RYB format that are of the sample image; generate a corresponding first training compensation array and a corresponding second training compensation array for the two training images; and train a preset learning algorithm based on the plurality of training samples, to determine target gain compensation arrays corresponding to different reference gain compensation arrays. The learning algorithm may be a shallow neural network, or may be a model based on a vector machine, a random forest, reinforcement learning, or the like.

S304: Adjust a second brightness layer of the RYB image by using the target gain compensation array, to generate a corrected image.

In this embodiment, after determining the target gain compensation array, the terminal device may obtain the second brightness layer of the RYB image. The second brightness layer is specifically a layer that is irrelevant to chrominance and related only to brightness. For a manner of generating a brightness layer, refer to related descriptions of S302. Details are not described herein again. In a possible implementation, the second brightness layer may be a normalized R/Y layer or a normalized B/Y layer. A manner of generating the normalized R/Y layer and the normalized B/Y layer may be as follows: The terminal device obtains a pixel value of a central coordinate point of the RYB image, uses the pixel value of the central point as a reference value, normalizes other pixels, calculates a first ratio of a pixel value on an R channel to a pixel value on a Y channel after each pixel are normalized, and forms the R/Y layer by using all the first ratios. Similarly, a second ratio of a pixel value on a B channel to a pixel value on the Y channel after each pixel are normalized may be calculated, to form the B/Y layer by using all the second ratios.

In this embodiment, the terminal device may adjust a pixel value of each pixel in the RYB image by using the target gain compensation array, so that a corrected image whose color shading is eliminated can be generated. In a possible implementation, the foregoing corrected image may be generated in the following manner Because the reference compensation array is generated based on the grid image, that is, a quantity of rows and columns of the reference compensation array is the same as a quantity of grids corresponding to the grid image, and the quantity of grids of the grid image is less than a quantity of pixels of the RYB image, a quantity of rows and columns of the target gain compensation array obtained through conversion based on the reference gain compensation array is also the same as that of the grid image. In a subsequent process of adjusting a brightness value, the terminal device may proportionally enlarge a target grid image, determine a pixel that is in the RYB image and that corresponds to each grid area, and adjust brightness values of all pixels included in the grid area by using a gain compensation coefficient of the grid area. An RGB image is converted into a grid image in a down-sampling manner, so that a calculation amount of subsequently determining a reference gain compensation coefficient can be reduced based on a feature that there is a strong relationship between the gain compensation coefficient and a location of a pixel in an image, and overall image processing efficiency is improved.

Figure 8:
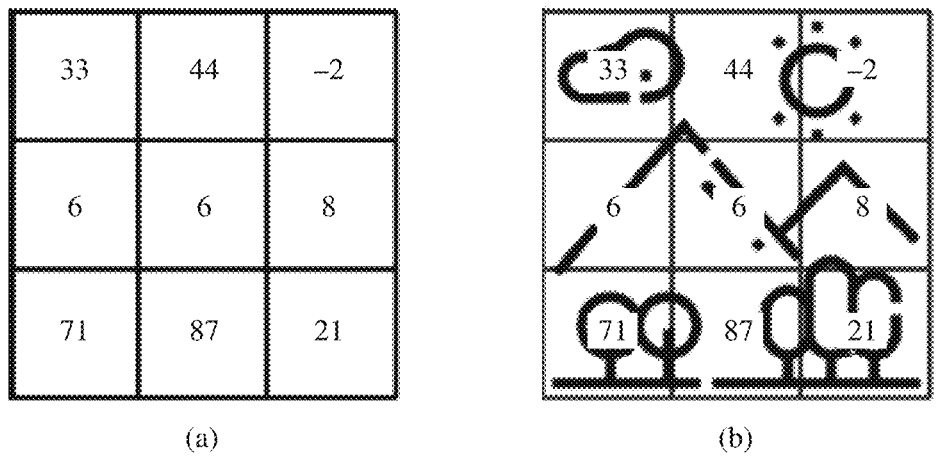
FIG. 8 is a schematic diagram of brightness adjustment according to an embodiment of this application.

As an example instead of a limitation, FIG. 8 is a schematic diagram of brightness adjustment according to an embodiment of this application. (a) in FIG. 8 is a target gain compensation array. (b) in FIG. 8 is a schematic diagram of adjusting a brightness value of each pixel at a second brightness layer of an RYB image based on each gain compensation coefficient in the target gain compensation array. Refer to FIG. 8. It may be determined that the target gain compensation array is a 3*3 grid matrix, each grid area corresponds to one adjustment coefficient, and the RYB image includes a plurality of pixels. The terminal device may adjust a size of the target gain compensation array to be consistent with that of the RYB image, each grid area may be associated with a corresponding pixel on the RYB image, a brightness value of an associated pixel may be adjusted based on the adjustment coefficient corresponding to the grid area, a corrected image is generated based on the adjusted second brightness layer, and color shading included in the image is eliminated.

In an existing possible implementation, the terminal device may ensure that a central pixel falls on a preset channel by calculating coordinates of the central pixel of the RYB image, divide the image by using the coordinates of the central pixel of the image as a center to obtain a target area after division, calculate an average value of each channel in the target area, use the average value as a gain adjustment target of a corresponding channel, and adaptively perform pixel compensation by using a target value and a location of the pixel. However, in the foregoing manner, the average value of each channel in the target area is mainly used as a gain adjustment target. This is not applicable to an image with rich colors. In addition, for an image with a relatively large quantity of pixels, a gain compensation value of each pixel needs to be calculated. This increases a calculation amount and reduces a calculation speed.

In an existing possible implementation, the terminal device may obtain a brightness value from each photosensitive point in a sensor array, set a group of weighted values that are used to compensate for each photosensitive point associated with a current setting of a camera that is based on a light field imaging principle, and change the brightness value of each photosensitive point by using the group of weighted values. However, for photographing modules based on the light field imaging principle in the foregoing manner, most existing photographing modules collect images based on an RYB image sensor principle. This reduces an application scope. In addition, shading correction is performed only by using a brightness value of a photosensitive point, and effective compensation cannot be performed for color shading correction, thereby reducing a correction effect.

In this embodiment of this application, to resolve the foregoing problem, and reduce a calculation amount and improve a calculation speed while ensuring an adjustment effect, the grid image based on the RGB format is generated by performing down-sampling and conversion on the RYB image, so that the gain compensation coefficient corresponding to each pixel does not need to be calculated. Therefore, a calculation amount for generating the target gain compensation array is reduced. In addition, the RGB format has a relatively good dispersion degree under different light sources. This improves accuracy of the target gain compensation array, and improves a calibration effect.

It can be learned from the foregoing that, according to the image processing method provided in this embodiment of this application, an RYB image is converted into a grid image that is based on an RGB format and that has a better discrete performance in different light source environments, and a first gain compensation array corresponding to the grid image is generated. Then, a second gain compensation array based on an RYB format is generated by using a preset compensation array correspondence, and the RYB image is adjusted by using the second gain compensation array to generate a corrected image. In this way, color distortion is avoided, and a brightness layer of the RYB image is adjusted by using the second gain compensation array. This eliminates color shading and improves an imaging effect.

Figure 9:
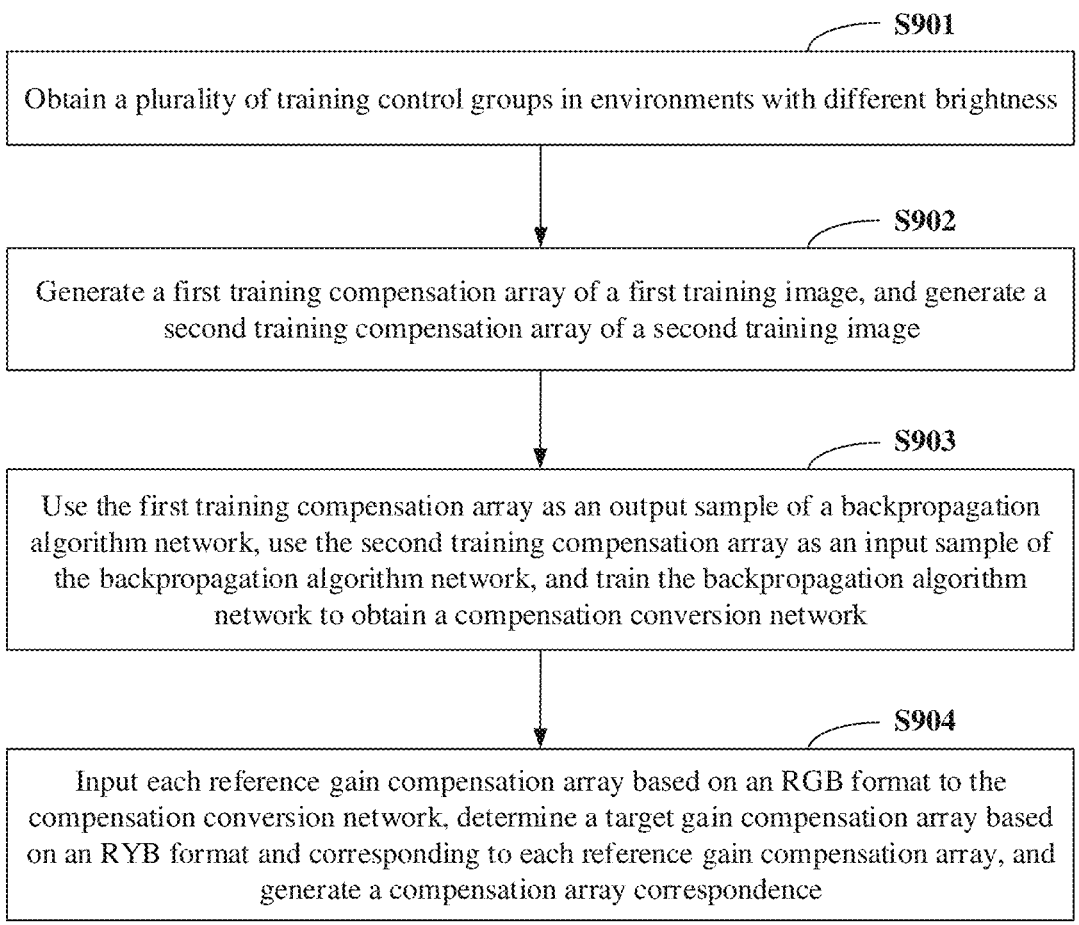
FIG. 9 is a specific implementation flowchart of an image processing method according to a second embodiment of this application.

FIG. 9 is a specific implementation flowchart of an image processing method according to a second embodiment of this application. Refer to FIG. 9. Compared with the embodiment in FIG. 3, in the image processing method provided in this embodiment, before obtaining, based on a preset compensation array correspondence, a second gain compensation array that is associated with a first gain compensation array and based on an RYB format, the method further includes S901 to S904. Details are as follows:

Further, before obtaining, based on a preset compensation array correspondence, a second gain compensation array that is associated with a first gain compensation array and based on an RYB format, the method further includes:

S901: Obtain a plurality of training control groups in environments with different brightness, where each training control group includes at least one first training image based on the RYB format and at least one second training image based on the RGB format.

In this embodiment, a terminal device may train and learn a preset backpropagation algorithm by using a large amount of sample data, so that a conversion relationship between a reference gain compensation array in an RGB format and a target gain compensation array in an RYB format can be established, and conversion of a compensation array can be implemented. Therefore, in S901, a large quantity of training control groups may be collected. The training control groups are included in a plurality of environments with different brightness, so that accuracy and an application scope of a subsequent correspondence can be improved.

For example, Table 1 is a schematic diagram of training control groups in environments with different brightness according to an embodiment of this application. Refer to Table 1. The brightness environment is determined by two parameters: a light source type and an illumination intensity. Table 1 shows eight different light source types: A, D50, D65, D75, H, TL83, TL84, and U30, and five illumination intensities: 1000 lux, 700 lux, 300 lux, 100 lux, and 20 lux. Therefore, a quantity of constructed brightness environments is 8*5=40, and a corresponding quantity of training control groups are configured for the 40 different brightness environments. In this embodiment, a quantity of training control groups in each brightness environment is 10, and therefore a total quantity of training samples is 400 groups.

TABLE 1

|      | 1000 lux | 700 lux | 300 lux | 100 lux | 20 lux |
|------|----------|---------|---------|---------|--------|
| H    | 10       | 10      | 10      | 10      | 10     |
| A    | 10       | 10      | 10      | 10      | 10     |
| U30  | 10       | 10      | 10      | 10      | 10     |
| TL83 | 10       | 10      | 10      | 10      | 10     |
| TL84 | 10       | 10      | 10      | 10      | 10     |
| D50  | 10       | 10      | 10      | 10      | 10     |
| D65  | 10       | 10      | 10      | 10      | 10     |
| D75  | 10       | 10      | 10      | 10      | 10     |

In this embodiment, each training control group includes at least one first training image based on the RYB format and at least one second training image based on the RGB format. Both the first training image and the second training image that belong to a same training control group are images obtained by photographing a same object at a same angle in a same brightness environment. The first training image may be an RYB image collected by using an RYB image sensor, or may be an RYB image obtained after format conversion is performed on an existing RGB image. Similarly, the second training image may be an RGB image collected by using an RGB image sensor, or may be an RGB image obtained after format conversion is performed on an existing RYB image.

S902: Generate a first training compensation array of the first training image, and generate a second training compensation array of the second training image.

In this embodiment, after obtaining the first training image based on the RYB format, the terminal device may configure the first training compensation array for the first training image. A manner of generating the first training compensation array may be manual configuration by a user or calculation of a compensation coefficient of each pixel by using a preset compensation algorithm, to generate the first training compensation array corresponding to the first training image.

In a possible implementation, a manner of configuring the first training compensation array may be specifically as follows: The terminal device generates a first training brightness layer of the first training compensation array. In addition, the terminal device may be configured with a plurality of preset candidate gain compensation arrays, to adjust the first training brightness layer by using each candidate gain array, identify a standard deviation between brightness values of grid areas at the adjusted first training brightness layer, and select a candidate gain compensation array with a minimum standard deviation value as the foregoing first training compensation array.

Similarly, a manner of generating the second training compensation array for the second training image is the same as the manner of generating the first training compensation array, and reference may be made to the foregoing description. Details are not described herein again.

S903: Use the first training compensation array as an output sample of a backpropagation algorithm network, use the second training compensation array as an input sample of the backpropagation algorithm network, and train the backpropagation algorithm network to obtain a compensation conversion network.

Figure 10:
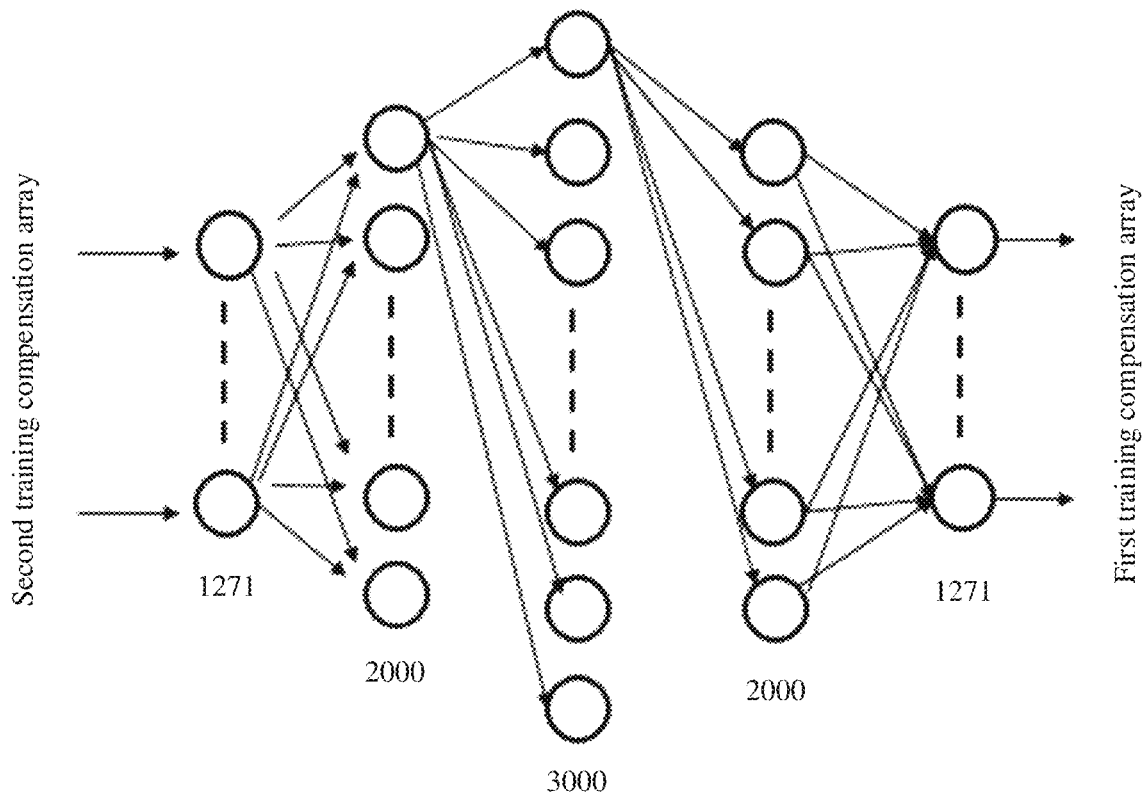
FIG. 10 is a schematic diagram of training of a BP network according to an embodiment of this application.

In this embodiment, the compensation conversion network may be constructed based on the backpropagation algorithm (BP) network. In this case, after obtaining a plurality of training control groups, the terminal device may train and learn the backpropagation algorithm network by using the plurality of training control groups. For example, FIG. 10 is a schematic diagram of training of a BP network according to an embodiment of this application. Refer to FIG. 10. The BP network includes five levels. A first level and a fifth level include 1271 network nodes, a second level and a fourth level include 2000 network nodes, and a third level includes 3000 network nodes. Corresponding learning parameters may be configured for different network nodes. The learning parameters are adjusted, so that the BP network is applicable to a scenario in which a correspondence between a reference gain compensation array and a target gain compensation array is established. An input parameter of the BP network is s second training compensation array based on an RGB format, and an output parameter is a first training compensation array based on an RYB format. In an input and output process, both the first training compensation array and the second training compensation array belong to a same training control group. It is determined, by calculating a loss rate corresponding to the BP network, whether adjustment of a BP network algorithm is completed. If the loss rate of the BP network is less than a preset loss threshold, it is identified that the BP network has been adjusted, and the adjusted BP network is identified as the compensation conversion network.

S904: Input each reference gain compensation array based on the RGB format to the compensation conversion network, determine a target gain compensation array based on the RYB format and corresponding to each reference gain compensation array, and generate the compensation array correspondence.

In this embodiment, after generating the compensation conversion network, the terminal device may establish the correspondence between the reference gain compensation array and the target gain compensation array by using the compensation conversion network. A quantity of reference gain compensation arrays based on the RGB format and a quantity of target gain compensation arrays based on the RYB format are both fixed. Therefore, each preconfigured reference gain compensation array based on the RGB format may be imported into the compensation conversion network, an associated target gain compensation array is determined and selected from existing target gain compensation arrays based on the RYB format, the reference gain compensation array is associated with the associated target gain compensation array, and the foregoing compensation array correspondence is generated based on all established association relationships.

In this embodiment of this application, a plurality of training control groups are created, and a preset BP network is trained by using the plurality of training control groups, to generate the compensation conversion network. A target gain compensation array associated with each reference gain compensation array is determined by using the generated compensation conversion network, so that accuracy of subsequent establishment of the compensation array correspondence can be improved, and accuracy of brightness adjustment can be improved.

Figure 11:
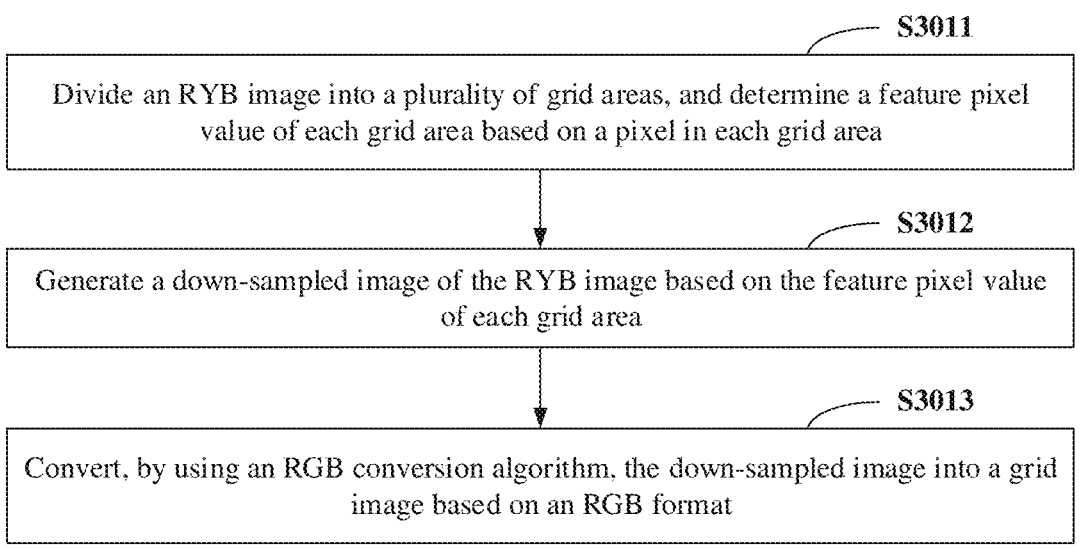
FIG. 11 is a specific implementation flowchart of an image processing method S301 according to a third embodiment of this application.

FIG. 11 is a specific implementation flowchart of an image processing method S301 according to a third embodiment of this application. Refer to FIG. 11. Compared with the embodiment in FIG. 3, in the image processing method provided in this embodiment, S301 includes S3011 to S3013. Details are as follows:

Further, the converting a red yellow blue RYB image into a grid image based on a red green blue RGB format includes:

S3011: Divide the RYB image into a plurality of grid areas, and determine a feature pixel value of each grid area based on a pixel in each grid area.

In this embodiment, a terminal device may first perform down-sampling on the RYB image, that is, represent the RYB image including a plurality of pixels by using a gridded down-sampled image. Specifically, a grid size may be configured for the terminal device, and an area corresponding to each grid area is determined based on the grid size and an image size of the RYB image. For example, if the RYB image before down-sampling is a 2100*1800 image, and a preset grid size is 3*3, an area size corresponding to each grid area is 700*600, and each grid area includes 420,000 pixels. If the RYB image before down-sampling is a 2100*2100 image, and a preset grid size is 3*3, an area size corresponding to each grid area is 700*700, and each grid area includes 490,000 pixels. Therefore, a size included in each grid area is related to the image size of the RYB image and the preset grid size.

In this embodiment, after dividing the RYB image into the plurality of grid areas, the terminal device may identify pixel values of pixels included in each grid area, and determine, based on all the pixel values, the feature pixel value corresponding to the grid area, so that the plurality of pixels can be represented by using one grid area. This implements down-sampling and reduces a quantity of pixels. In a possible implementation, a manner of determining the feature pixel value may be: The terminal device uses an average value of pixel values of pixels in the grid area as the feature pixel value of the grid area; or the terminal device uses a pixel value of a central coordinate point of the grid area as the feature pixel value of the grid area.

In a possible implementation, the terminal device may determine a weighted weight of each pixel based on a distance between each pixel in the grid area and a central coordinate point corresponding to the grid area, calculate a weighted average value of pixel values of the pixels, and use the weighted average value as the feature pixel value.

S3012: Generate a down-sampled image of the RYB image based on the feature pixel value of each grid area.

Figure 12:
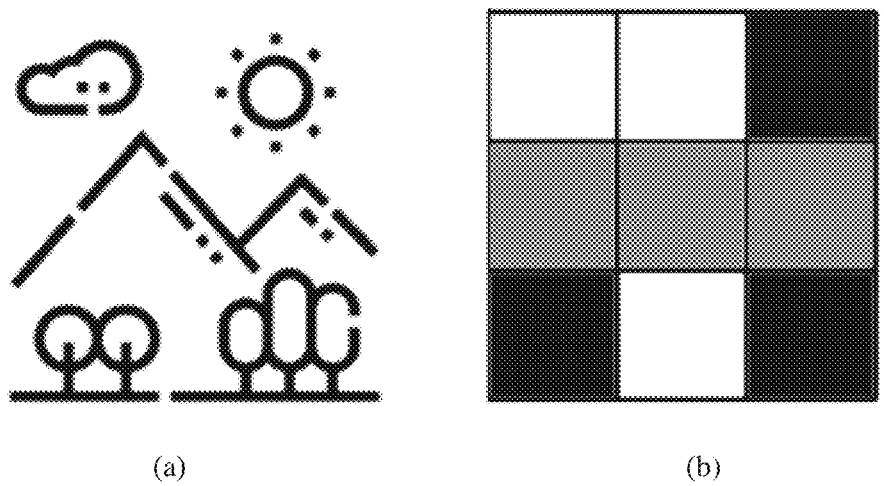
FIG. 12 is a schematic diagram of generation of a downsampled image according to an embodiment of this application.

In this embodiment, the terminal device combines the plurality of grid areas based on the feature pixel value of each grid area and a location area in which the grid area is located, to generate the down-sampled image corresponding to the RYB image. FIG. 12 is a schematic diagram of generation of a down-sampled image according to an embodiment of this application. (a) in FIG. 12 is an RYB image before down-sampling, and (b) in FIG. 12 is a down-sampled image of the RYB image. Refer to FIG. 12. The terminal device may down-sample an image including a plurality of pixels into a grid image, so that an image size can be reduced, and a processing speed can be improved.

S3013: Convert, by using an RGB conversion algorithm, the down-sampled image into the grid image based on the RGB format.

In this embodiment, because the down-sampled image is generated based on the RYB format, three channels included in the down-sampled image are an R channel, a Y channel, and a B channel respectively. The terminal device needs to convert the down-sampled image in the RYB format into the grid image based on the RGB format. Therefore, the terminal device may generate, by using a preset RGB conversion algorithm, the grid image in the RGB format corresponding to the down-sampled image.

In a possible implementation, the RGB conversion algorithm may be specifically as follows: The terminal device may obtain, through calculation by using the following algorithm, a pixel value of a G channel after each pixel in the RYB image is converted into the RGB image: $G=(2Y-R)$, where G indicates the pixel value of the G channel, Y indicates a pixel value of the Y channel before conversion, and R indicates a pixel value of the R channel before conversion.

In this embodiment of this application, down-sampling is first performed on the RYB image to obtain the down-sampled image, and then RGB format conversion is performed to generate the grid image, so that a calculation amount of format conversion can be reduced, and operation efficiency is improved.

Figure 13:
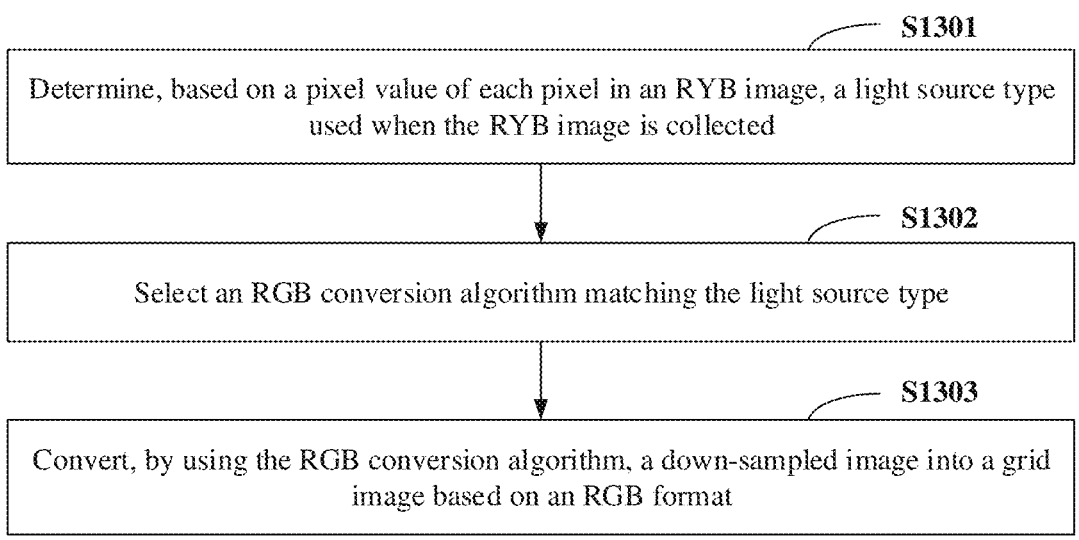
FIG. 13 is a specific implementation flowchart of an image processing method S3013 according to a fourth embodiment of this application.

FIG. 13 is a specific implementation flowchart of an image processing method S3013 according to a fourth embodiment of this application. Refer to FIG. 13. Compared with the embodiment in FIG. 11, in the image processing method provided in this embodiment, S3013 includes S1301 to S1303. Details are as follows:

Further, the converting the down-sampled image into the grid image based on the RGB format includes:

S1301: Determine, based on a pixel value of each pixel in the RYB image, a light source type used when the RYB image is collected.

In this embodiment, the terminal device may generate a brightness layer of the RYB image based on the pixel value of each pixel in the RYB image, and identify, based on a brightness value of each pixel at the brightness layer, the light source type used when the RYB image is photographed. In a possible implementation, the terminal device may match different candidate light sources based on a brightness value of a central coordinate point of the RYB image, and determine the light source type of the RYB image based on a matching result. The light source type includes but is not limited to eight light source types such as A, D50, D65, D75, H, TL83, TL84, and U30. Optionally, the light source type may further include a light intensity, that is, the light source type may be represented by using (A, 200 lux).

S1302: Select the RGB conversion algorithm matching the light source type.

In this embodiment, the terminal device may configure corresponding RGB algorithms for different light source types. After determining a corresponding light source type when the RYB image is photographed, the terminal device may select, from an RGB conversion algorithm library, an RGB conversion algorithm corresponding to the light source type. The foregoing RGB conversion algorithm is specifically a conversion algorithm for converting the RYB format into the RGB format.

In a possible implementation, the RGB conversion algorithm may be a conversion matrix. Table 2 shows an index table of an RGB conversion algorithm according to an embodiment of this application. Refer to Table 2. The index table provides conversion matrices corresponding to eight different light source types, which are respectively A, D50, D65, D75, H, TL83, CWF, and U30. Because the RYB image needs to be converted into the RGB image, and the foregoing two images are images including three channels, a corresponding conversion matrix is a 3*3 matrix. For example, for the U30 light source type, a corresponding conversion matrix is as follows:

$$\begin{bmatrix} 100, 46, -71 \\ -461, 1399, 86 \\ -136, 57, 1103 \end{bmatrix}.$$

TABLE 2

| D75 | 984 | 11 | 29 | −300 | 1261 | 63 | −29 | 43 | 1010 |
| D65 | 984 | 11 | 29 | −300 | 1261 | 63 | −29 | 43 | 1010 |
| D50 | 984 | 11 | 29 | −300 | 1261 | 63 | −29 | 43 | 1010 |
| CWF | 991 | −18 | 51 | −271 | 1217 | 78 | −26 | 6 | 1044 |
| TL84 | 978 | 11 | 35 | −370 | 1343 | 51 | −49 | 42 | 1031 |
| U30 | 1049 | 46 | −71 | −461 | 1399 | 86 | −136 | 57 | 1103 |
| A | 1092 | 7 | −75 | −609 | 1525 | 108 | −240 | 19 | 1245 |
| H | 1092 | 7 | −75 | −609 | 1525 | 108 | −240 | 19 | 1245 |

S1303: Convert, by using the RGB conversion algorithm, the down-sampled image into the grid image based on the RGB format.

In this embodiment, after obtaining the RGB conversion algorithm that matches the light source type corresponding to the RYB image, the terminal device may convert the down-sampled image into the grid image based on the RGB format by using the foregoing RGB conversion algorithm. In a possible implementation, if the RGB algorithm is specifically a conversion matrix, an image matrix of the grid image based on the RGB format may be obtained by using a right-multiply conversion matrix on the image matrix corresponding to the down-sampled image. For example, the foregoing recognized light source type is U30. Therefore, a selected RGB conversion matrix is as described above. An image array corresponding to the down-sampled image in the RYB format is multiplied by the conversion matrix corresponding to U30 to obtain the grid image based on the RGB format. A calculation manner is as follows:

$$[R, Y, B] * \begin{bmatrix} 100, 46, -71 \\ -461, 1399, 86 \\ -136, 57, 1103 \end{bmatrix} = [R, G, B]$$

Herein, [R, Y, B] is an image array corresponding to the down-sampled image, and [R, G, B] is an image array corresponding to the grid image.

In this embodiment of this application, a light source type used when the RYB image is photographed is identified, and an RGB conversion algorithm corresponding to the light source type is selected, so that the down-sampled image is converted into the grid image. This improves accuracy of converting the grid image, and improves a correction effect of a subsequent operation.

Figure 14:
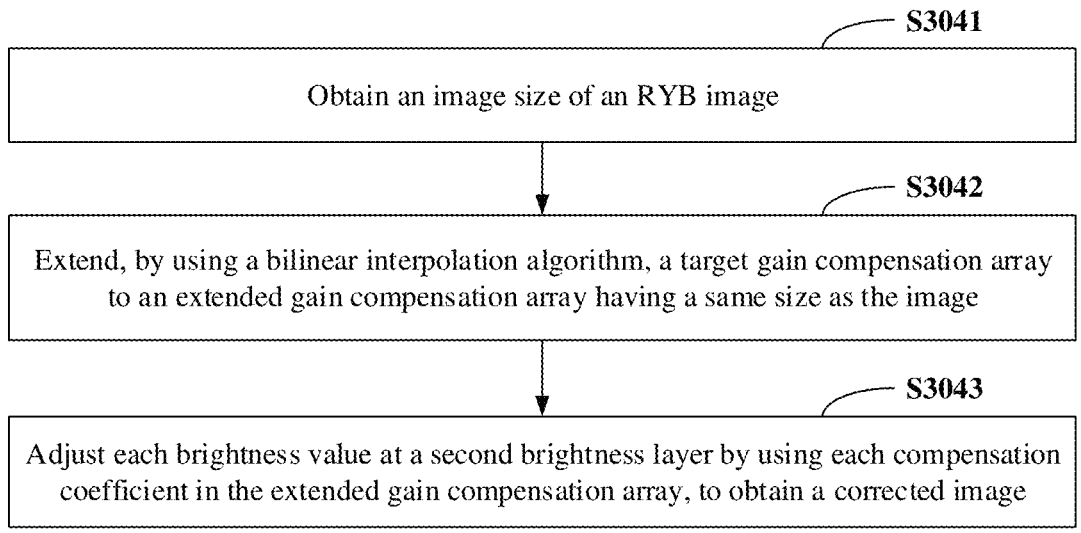
FIG. 14 is a specific implementation flowchart of an image processing method S304 according to a fifth embodiment of this application.

FIG. 14 is a specific implementation flowchart of an image processing method S304 according to a fifth embodiment of this application. Refer to FIG. 14. Compared with the embodiment in FIG. 3, in the image processing method provided in this embodiment, S304 includes S3041 to S3043. Details are as follows:

Further, the adjusting a second brightness layer of the RYB image by using the target gain compensation array, to generate a corrected image includes:

S3041: Obtain an image size of the RYB image.

In this embodiment, because the target gain compensation array is generated by using a down-sampled grid image in an RGB format, an array size of the target gain compensation array is inconsistent with a size of an original RYB. Therefore, the target gain compensation array needs to be extended to a size of the original image. Based on this, the terminal device may obtain the image size of the RYB image. The image size may be determined by a quantity of pixels, or may be represented in a manner of image resolution and an image length.

S3042: Extend, by using a bilinear interpolation algorithm, the target gain compensation array to an extended gain compensation array having a same size as the image.

In this embodiment, after determining the image size and the array size of the target gain compensation array, the terminal device may determine a scaling ratio, adjust the bilinear interpolation algorithm based on the scaling ratio, and generate, by using the adjusted bilinear interpolation algorithm and a gain value of each element of the target gain compensation array, the extended gain compensation array that matches the image size. The bilinear interpolation algorithm may be specifically:

$$f(x, y) = \frac{f(Q_{11})}{(x_2 - x_1)(y_2 - y_1)}(x_2 - x)(y_2 - y) + \frac{f(Q_{21})}{(x_2 - x_1)(y_2 - y_1)}(x - x_1)(y_2 - y) + \frac{f(Q_{12})}{(x_2 - x_1)(y_2 - y_1)}(x_2 - x)(y - y_1) + \frac{f(Q_{22})}{(x_2 - x_1)(y_2 - y_1)}(x - x_1)(y - y_1)$$

Herein, f(Q_{ij}) is a gain compensation coefficient corresponding to a coordinate $(x_i, y_j)$ in the target gain compensation array; $x_1$ and $x_2$ are two horizontal coordinates closest to any coordinate (x, y) in the extended gain compensation array; $y_1$ and $y_2$ are two vertical coordinates closest to any coordinate (x, y) in the extended gain compensation array; and f(x, y) is a gain compensation value of any coordinate (x, y) in the extended gain compensation array.

S3043: Adjust each brightness value at the second brightness layer by using each compensation coefficient in the extended gain compensation array, to obtain the corrected image.

In this embodiment, an array size of the extended gain compensation array is consistent with the image size of the RYB image. Therefore, each gain compensation value in the extended gain compensation array may be used to adjust each brightness value at the second brightness layer of the RYB image, and generate the corrected image based on the adjusted second brightness layer.

In a possible implementation, a manner of generating the foregoing corrected image may be specifically as follows: The second brightness layer corresponding to the RYB image specifically includes: a normalized R/Y layer and a normalized B/Y layer. Therefore, the foregoing obtained extended gain compensation array also includes a first gain compensation array used to adjust the R/Y layer and a second gain compensation array used to adjust the B/Y layer. Each pixel value at the R/Y layer is adjusted by using the first gain compensation array, and an inverse normalization operation is performed on the adjusted R/Y layer, to obtain an adjusted R layer and first Y layer. Similarly, an adjusted B layer and second Y layer may be obtained in the foregoing manner, an average value between the two Y layers is calculated, and an adjusted Y layer is combined, so as to generate the foregoing corrected image by using the adjusted R layer, the adjusted Y layer, and the adjusted B layer.

In this embodiment of this application, the target gain compensation array is extended to the extended gain compensation array that matches the size of the image, so as to adjust each pixel in the RYB image. This improves correction accuracy.

Figure 15:
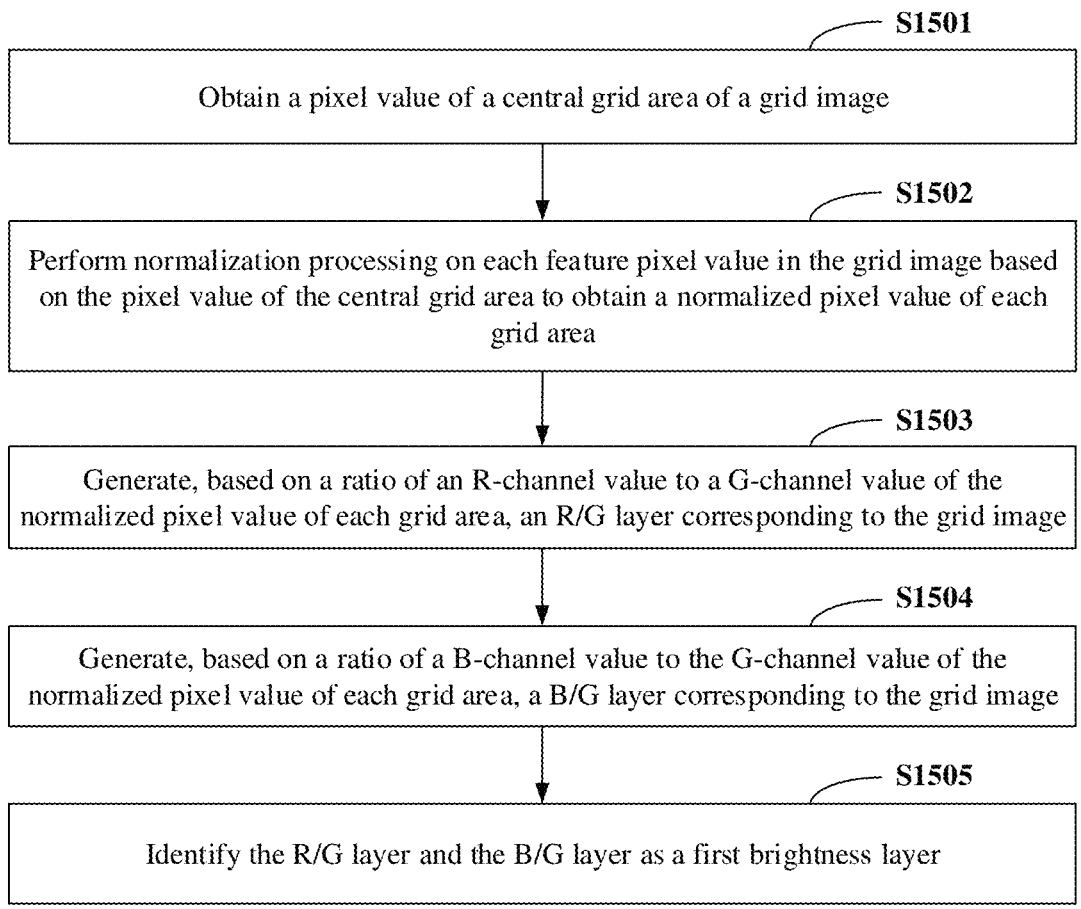
FIG. 15 is a specific implementation flowchart of an image processing method S302 according to a sixth embodiment of this application.

FIG. 15 is a specific implementation flowchart of an image processing method S302 according to a sixth embodiment of this application. Refer to FIG. 15. Compared with any one of the embodiments in FIG. 3, FIG. 9, FIG. 11, FIG. 13, and FIG. 14, in the image processing method provided in this embodiment, S303 includes S1501 to S1505. Details are as follows:

Further, the generating a first brightness layer of the grid image, and determining a reference gain compensation array used to adjust the first brightness layer includes:

S1501: Obtain a pixel value of a central grid area of the grid image.

In this embodiment, a terminal device may use a normalized R/G layer and a normalized B/G layer as the first brightness layer of the grid image. A reference value needs to be determined before the normalized R/G layer and the normalized B/G layer are generated. Therefore, the pixel value of the central grid area of the grid image needs to be determined, and the pixel value of the central grid area is used as the reference value. Because a transmittance of the central area is relatively high, that is, a distortion rate is relatively low, which matches a situation of an actual photographing light source, the pixel value of the central area may be used as the reference value to perform a normalization operation on an entire image.

S1502: Perform normalization processing on each feature pixel value in the grid image based on the pixel value of the central grid area to obtain a normalized pixel value of each grid area.

In this embodiment, the terminal device may use the pixel value of the central grid area as the reference value, and perform normalization processing on each feature pixel value in the grid area, to determine a normalized pixel value of each grid area. For example, if the pixel value of the central grid area is $(R_0, G_0, B_0)$, and a feature pixel value corresponding to any grid area is (R, G, B), the normalized pixel value is $$\left(\frac{R}{R_0}, \frac{G}{G_0}, \frac{B}{B_0}\right).$$

S1503: Generate, based on a ratio of an R-channel value to a G-channel value of the normalized pixel value of each grid area, an R/G layer corresponding to the grid image.

In this embodiment, the terminal device may calculate the ratio of the R-channel value to the G-channel value of the normalized pixel value corresponding to each grid area, to obtain a brightness value of the grid area, that is, $$\frac{RG_0}{R_0G},$$

and generate the R/G layer based on the brightness value corresponding to each grid area.

S1504: Generate, based on a ratio of a B-channel value to the G-channel value of the normalized pixel value of each grid area, a B/G layer corresponding to the grid image.

In this embodiment, the terminal device may calculate the ratio of the B-channel value to the G-channel value of the normalized pixel value corresponding to each grid area, to obtain a brightness value of the grid area, that is, $$\frac{BG_0}{B_0G},$$

and generate the B/G layer based on the brightness value corresponding to each grid area.

Figure 16:
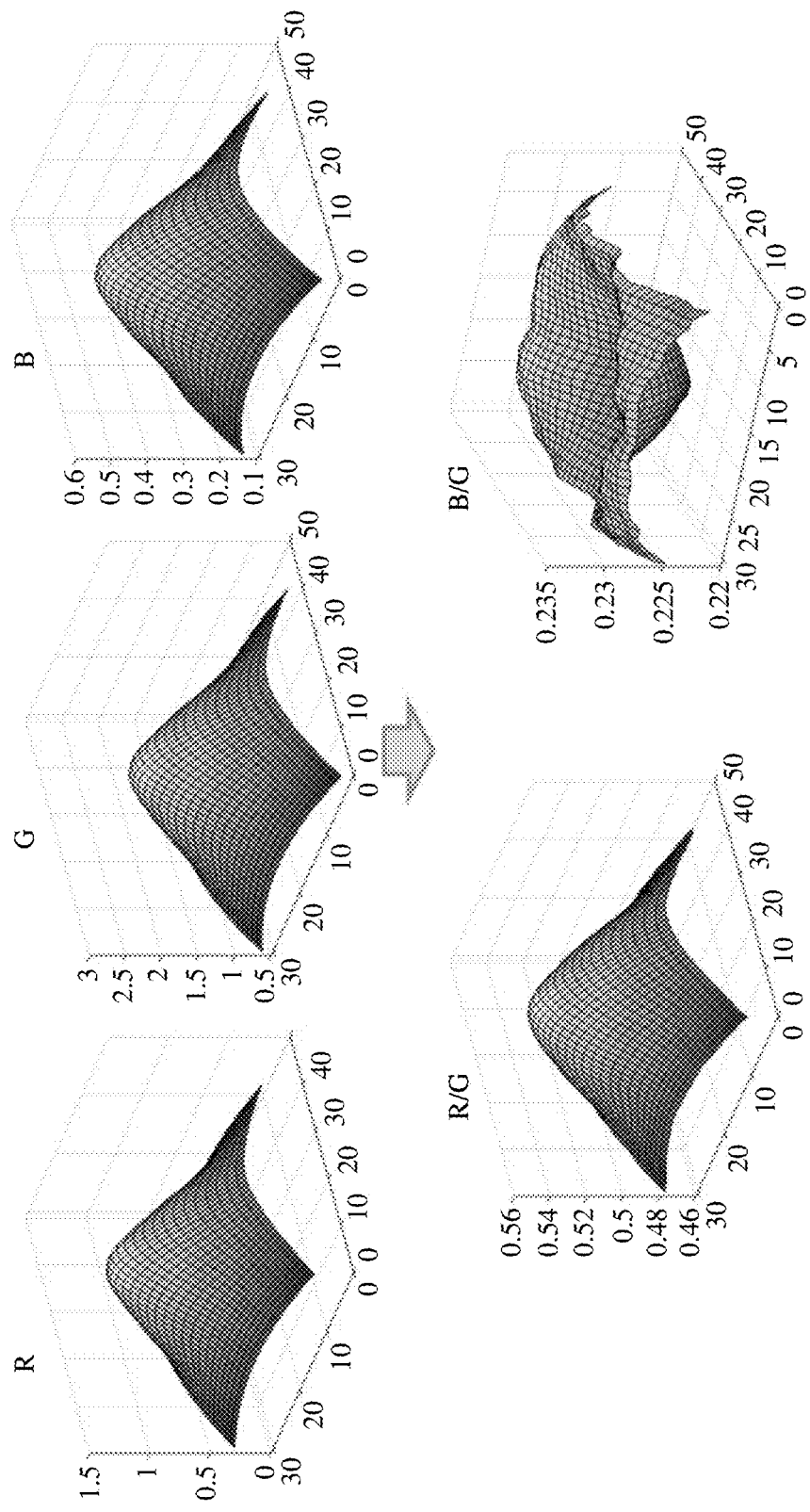
FIG. 16 is a schematic diagram of generation of an R/G layer and a B/G layer according to an embodiment of this application.

For example, FIG. 16 is a schematic diagram of generation of an R/G layer and a B/G layer according to an embodiment of this application. Refer to FIG. 16. Three-dimensional surfaces that are of a grid image in an RGB format and that correspond to three RGB channels are as follows. After normalization processing is performed and normalized pixels are divided, an R/G layer and a B/G layer are obtained.

S1505: Identify the R/G layer and the B/G layer as the first brightness layer.

In this embodiment, the foregoing two layers are collectively referred to as the first brightness layer.

In this embodiment of this application, the grid image is normalized to generate the normalized R/G layer and the normalized B/G layer, and the foregoing two layers are used as the first brightness layer of the grid image, so that pixel values of different channels can be adjusted subsequently, and adjustment efficiency and accuracy are improved.

Figure 17:
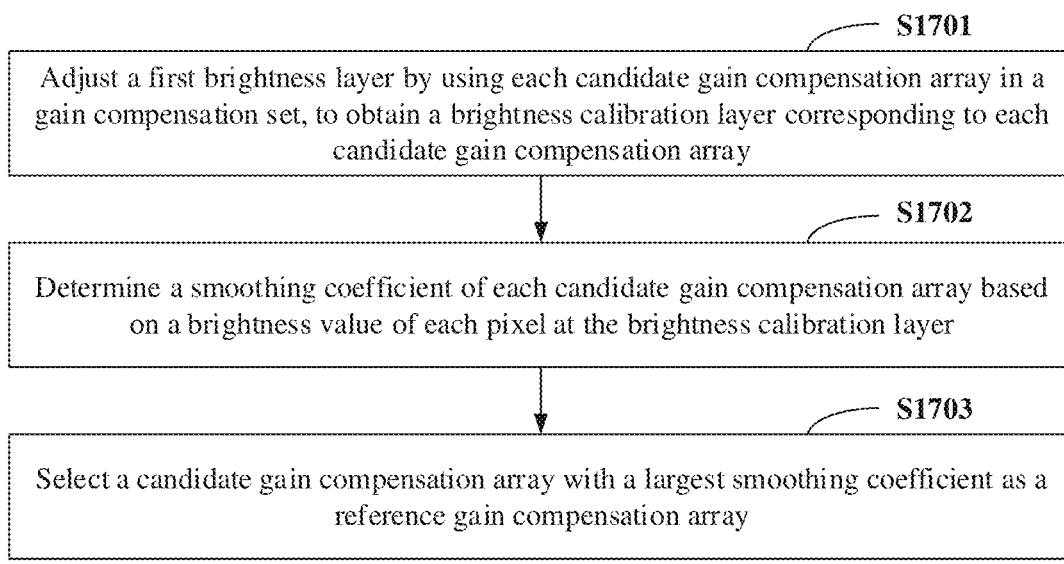
FIG. 17 is a specific implementation flowchart of an image processing method S302 according to a seventh embodiment of this application.

FIG. 17 is a specific implementation flowchart of an image processing method S302 according to a seventh embodiment of this application. Refer to FIG. 17. Compared with any one of the embodiments in FIG. 3, FIG. 9, FIG. 11, FIG. 13, and FIG. 14, in the image processing method provided in this embodiment, S302 includes S1701 to S1703. Details are as follows:

Further, the generating a first brightness layer of the grid image, and determining a reference gain compensation array used to adjust the first brightness layer includes:

S1701: Adjust the first brightness layer by using each candidate gain compensation array in a gain compensation set, to obtain a brightness calibration layer corresponding to each candidate gain compensation array.

In this embodiment, a quantity of gain compensation arrays for brightness adjustment may be fixed. In this case, all candidate gain compensation arrays may be stored in a gain compensation set. In each adjustment process, the terminal device may extract each candidate gain compensation array from the gain compensation set to adjust the brightness layer, so as to obtain the brightness calibration layer. If the manner in the fifth embodiment is used for the first brightness layer, that is, the first brightness layer includes the normalized R/G layer and the normalized B/G layer, brightness calibration layers corresponding to the foregoing two layers may be separately generated, and corresponding reference gain compensation arrays are separately configured for the foregoing two layers.

S1702: Determine a smoothing coefficient of each candidate gain compensation array based on a brightness value of each pixel at the brightness calibration layer.

In this embodiment, the terminal device may calculate, based on the brightness value of each pixel at the brightness calibration layer, a smoothing coefficient corresponding to the candidate gain compensation array. The smoothing coefficient may be determined based on a standard deviation or a mean square error of each brightness value. The terminal device may further generate a three-dimensional curved surface corresponding to the brightness calibration layer, obtain a discrete coefficient of the three-dimensional curved surface, and determine the smoothing coefficient based on the discrete coefficient. A higher degree of dispersion indicates a smaller value of the smoothing coefficient.

In a possible implementation, after adjusting the first brightness layer by using one candidate gain compensation array each time to generate a brightness calibration layer, the terminal device may calculate a smoothing coefficient of the brightness calibration layer. When detecting that the smoothing coefficient is greater than a preset smoothing threshold, the terminal device identifies the candidate gain compensation array as a reference gain compensation array, without continuing to adjust the first brightness layer by using another candidate gain compensation array. On the contrary, if the smoothing coefficient is less than or equal to the preset smoothing threshold, other candidate gain compensation arrays continue to be extracted from the gain compensation set to adjust the first brightness layer until it is detected that the smoothing coefficient is greater than the preset smoothing threshold or smoothing coefficients corresponding to all candidate gain compensation arrays are obtained by calculation.

S1703: Select a candidate gain compensation array with a largest smoothing coefficient as the reference gain compensation array.

In this embodiment, the terminal device may select the candidate gain compensation array with the largest smoothing coefficient value as the reference gain compensation array. Because a larger smoothing coefficient indicates a smaller difference between brightness values of adjusted brightness calibration layers, a corresponding three-dimensional curved surface approaches a plane, and a color shading degree is relatively low, the corresponding candidate gain compensation array may be used as the reference gain compensation array.

In this embodiment of this application, the smoothing coefficient corresponding to each candidate gain compensation array is calculated, so that a reference compensation array with a best smoothing effect can be selected. This improves accuracy of selecting the gain compensation array.

It should be understood that sequence numbers of the steps do not mean an execution sequence in the foregoing embodiments. The execution sequence of the processes should be determined based on functions and internal logic of the processes, and should not constitute any limitation on the implementation processes of the embodiments of this application.

Corresponding to the image processing method in the foregoing embodiments, FIG. 17 is a block diagram of a structure of an image processing apparatus according to an embodiment of this application. For ease of description, only a part related to embodiments of this application are shown.

Figure 18:
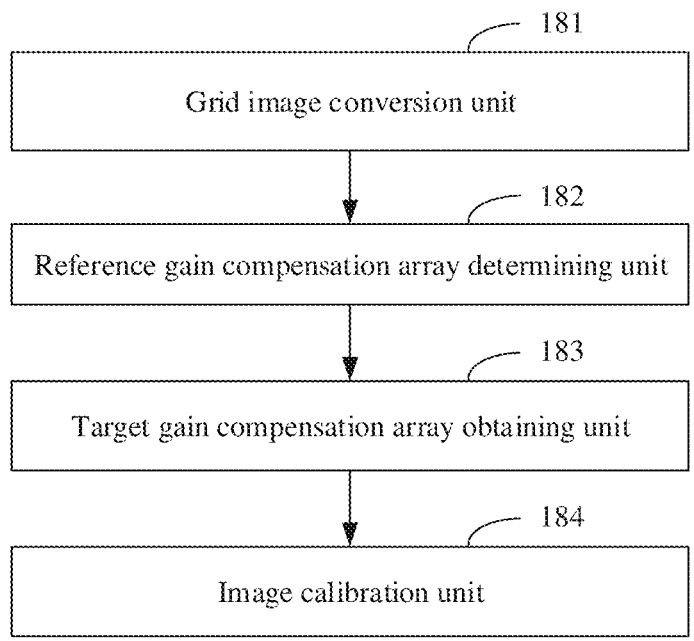
FIG. 18 is a block diagram of a structure of an image processing device according to an embodiment of this application.

Refer to FIG. 18. The image processing apparatus includes:

a grid image conversion unit 181, configured to convert a red yellow blue RYB image into a grid image based on a red green blue RGB format;

a reference gain compensation array determining unit 183, configured to: generate a first brightness layer of the grid image, and determine a reference gain compensation array used to adjust the first brightness layer;

a target gain compensation array obtaining unit 183, configured to obtain, based on a preset compensation array correspondence, a target gain compensation array that is associated with the reference gain compensation array and based on an RYB format; and an image calibration unit 184, configured to adjust a second brightness layer of the RYB image by using the target gain compensation array, to generate a corrected image.

Optionally, the image processing apparatus further includes:

a training control group obtaining unit, configured to obtain a plurality of training control groups in environments with different brightness, where each training control group includes at least one first training image based on the RYB format and at least one second training image based on the RGB format;

a training compensation array generation unit, configured to: generate a first training compensation array of the first training image, and generate a second training compensation array of the second training image;

a training and learning unit, configured to: use the first training compensation array as an output sample of a backpropagation algorithm network, use the second training compensation array as an input sample of the backpropagation algorithm network, and train the backpropagation algorithm network to obtain a compensation conversion network; and a compensation array correspondence establishment unit, configured to: input each reference gain compensation array based on the RGB format to the compensation conversion network, determine a target gain compensation array based on the RYB format and corresponding to each reference gain compensation array, and generate the compensation array correspondence.

Optionally, the grid image conversion unit 181 includes:
- a feature pixel value determining unit, configured to: divide the RYB image into a plurality of grid areas, and determine a feature pixel value of each grid area based on a pixel in each grid area;
- a down-sampled image generation unit, configured to generate a down-sampled image of the RYB image based on the feature pixel value of each grid area; and
- a down-sampled image conversion unit, configured to convert, by using an RGB conversion algorithm, the down-sampled image into the grid image based on the RGB format.

Optionally, the down-sampled image conversion unit includes:
- a light source type determining unit, configured to determine, based on a pixel value of each pixel in the RYB image, a light source type used when the RYB image is collected;
- an RGB conversion algorithm selection unit, configured to select the RGB conversion algorithm matching the light source type; and
- an RGB conversion algorithm adjustment unit, configured to convert, by using the RGB conversion algorithm, the down-sampled image into the grid image based on the RGB format.

Optionally, the image calibration unit 183 includes:
- an image size obtaining unit, configured to obtain an image size of the RYB image;
- a gain compensation array extension unit, configured to extend, by using a bilinear interpolation algorithm, the target gain compensation array to an extended gain compensation array having a same size as the image; and
- a corrected image generation unit, configured to adjust each brightness value at the second brightness layer by using each compensation coefficient in the extended gain compensation array, to obtain the corrected image.

Optionally, the reference gain compensation array determining unit 182 includes:
- a central pixel value obtaining unit, configured to obtain a pixel value of a central grid area of the grid image;
- a normalized pixel value determining unit, configured to perform normalization processing on each feature pixel value in the grid image based on the pixel value of the central grid area to obtain a normalized pixel value of each grid area;
- an R/G layer generation unit, configured to generate, based on a ratio of an R-channel value to a G-channel value of the normalized pixel value of each grid area, an R/G layer corresponding to the grid image;
- a B/G layer generation unit, configured to generate, based on a ratio of a B-channel value to the G-channel value of the normalized pixel value of each grid area, a B/G layer corresponding to the grid image; and
- a first brightness layer generation unit, configured to identify the R/G layer and the B/G layer as the first brightness layer.

Optionally, the reference gain compensation array determining unit 182 includes:
- a brightness calibration layer generation unit, configured to adjust the first brightness layer by using each candidate gain compensation array in a gain compensation set, to obtain a brightness calibration layer corresponding to each candidate gain compensation array;
- a smoothing coefficient calculation unit, configured to determine a smoothing coefficient of each candidate gain compensation array based on a brightness value of each pixel at the brightness calibration layer; and
- a candidate gain compensation array selection unit, configured to select a candidate gain compensation array with a largest smoothing coefficient as the reference gain compensation array.

Therefore, the image processing apparatus provided in this embodiment of this application may also convert the RYB image into a grid image that is based on an RGB format and that has a better discrete performance in different light source environments, generate a first gain compensation array corresponding to the grid image, then generate, by using a preset compensation array correspondence, a second gain compensation array based on an RYB format, and adjust the RYB image by using the second gain compensation array to generate a corrected image. In this way, color distortion is avoided, and a brightness layer of the RYB image is adjusted by using the second gain compensation array. This eliminates color shading and improves an imaging effect.

Figure 19:
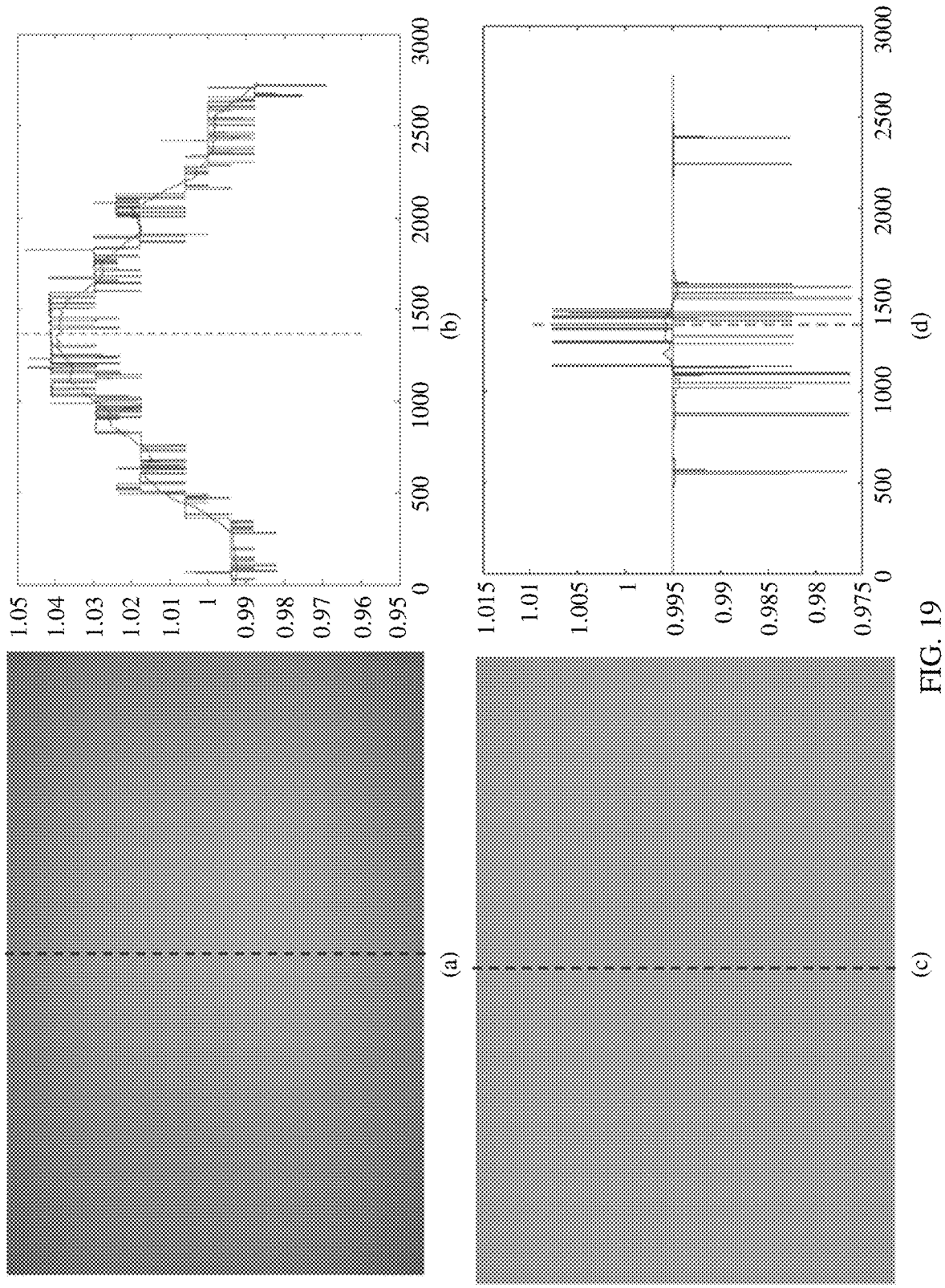
FIG. 19 is a schematic diagram of image correction according to an embodiment of this application.

As an example instead of a limitation, FIG. 19 is a schematic diagram of image correction according to an embodiment of this application. (a) in FIG. 19 is a brightness layer of an RYB image before adjustment. (b) in FIG. 19 is a diagram of pixel distribution of an R/G layer corresponding to the brightness layer of the RYB image before adjustment. A horizontal coordinate is pixel column coordinates, and a vertical coordinate is a normalized R/G value. (c) in FIG. 19 is a brightness layer of the RYB image after adjustment based on a target gain compensation array. (d) in FIG. 19 is a diagram of pixel distribution of the R/G layer corresponding to the brightness layer of the RYB image after adjustment. A horizontal coordinate is pixel column coordinates, and a vertical coordinate is a normalized R/G value. It can be determined from FIG. 19 that, after the brightness layer of the RYB image is adjusted according to this embodiment provided in this application, color shading can be effectively reduced, so that image quality is improved, and problems of a color difference and color shading of the image are resolved.

Figure 20:
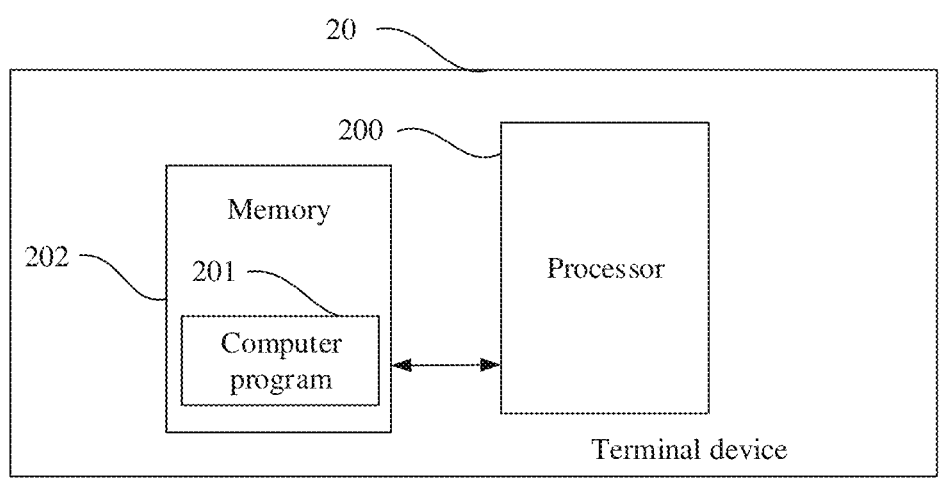
FIG. 20 is a schematic diagram of a terminal device according to another embodiment of this application.

FIG. 20 is a schematic diagram of a structure of a terminal device according to an embodiment of this application. As shown in FIG. 20, a terminal device 20 in this embodiment includes: at least one processor 200 (only one processor is shown in FIG. 20), a memory 201, and a computer program 202 that is stored in the memory 201 and that can be run on the at least one processor 200. When executing the computer program 202, the processor 200 implements steps in any one of the foregoing image processing method embodiments.

The terminal device 20 may be a computing device such as a desktop computer, a notebook computer, a palmtop computer, or a cloud server. The terminal device may include but is not limited to: the processor 200 and the memory 201. Persons skilled in the art may understand that FIG. 20 is merely an example of the terminal device 20, and does not constitute a limitation on the terminal device 20. The terminal device 20 may include more or fewer components than those shown in the figure, or some components may be combined, or different components may be used. For example, the terminal device 20 may further include an input/output device, a network access device, or the like.

The processor 200 may be a central processing unit (Central Processing Unit, CPU). The processor 200 may alternatively be another general-purpose processor, a digital signal processor (Digital Signal Processor, DSP), an application-specific integrated circuit (Application-Specific Integrated Circuit, ASIC), a field-programmable gate array (Field-Programmable Gate Array, FPGA) or another programmable logic device, a discrete gate or a transistor logic device, or a discrete hardware component. The general-purpose processor may be a microprocessor, or the processor may be any conventional processor or the like.

In some embodiments, the memory 201 may be an internal storage unit of the terminal device 20, for example, a hard disk or a memory of the terminal device 20. In some other embodiments, the memory 201 may alternatively be an external storage device of the terminal device 20, for example, a removable hard disk, a smart media card (Smart Media Card, SMC), a secure digital (Secure Digital, SD) card, a flash card (Flash Card), or the like that is provided on the terminal device 20. Further, the memory 201 may alternatively include both the internal storage unit and the external storage device of the terminal device 20. The memory 201 is configured to store an operating system, an application, a BootLoader (BootLoader), data, another program, and the like, for example, program code of the computer program. The memory 201 may further be configured to temporarily store data that has been output or is to be output.

It should be noted that content such as information exchange between the foregoing apparatuses/units and the execution processes thereof is based on a same concept as the method embodiments of this application. For specific functions and technical effects of the content, refer to the method embodiments. Details are not described herein again.

It may be clearly understood by persons skilled in the art that, for the purpose of convenient and brief description, division of the foregoing function units and modules is used as an example for illustration. In actual application, the foregoing functions can be allocated to different function units and modules for implementation based on a requirement, that is, an inner structure of the apparatus is divided into different function units or modules to implement all or some of the functions described above. Function units and modules in embodiments may be integrated into one processing unit, or each of the units may exist alone physically, or two or more units may be integrated into one unit. The integrated unit may be implemented in a form of hardware, or may be implemented in a form of a software function unit. In addition, specific names of the function units and modules are merely for ease of distinguishing between the function units and modules, but are not intended to limit the protection scope of this application. For a specific working process of the units and modules in the foregoing system, refer to a corresponding process in the foregoing method embodiments. Details are not repeatedly described herein.

An embodiment of this application further provides a network device. The network device includes at least one processor, a memory, and a computer program that is stored in the memory and that can run on the at least one processor. When executing the computer program, the processor implements steps in any one of the foregoing method embodiments.

An embodiment of this application further provides a computer-readable storage medium. The computer-readable storage medium stores a computer program. When the computer program is executed by a processor, steps in the foregoing method embodiments can be implemented.

An embodiment of this application provides a computer program product. When the computer program product runs on a mobile terminal, the mobile terminal is enabled to implement steps in the foregoing method embodiments when executing the computer program product.

When the integrated unit is implemented in the form of a software function unit and sold or used as an independent product, the integrated unit may be stored in a computer-readable storage medium. Based on such an understanding, all or some of the processes of the method in embodiments of this application may be implemented by a computer program instructing related hardware. The computer program may be stored in a computer-readable storage medium. When the computer program is executed by the processor, steps of the foregoing method embodiments may be implemented. The computer program includes computer program code. The computer program code may be in a source code form, an object code form, an executable file form, some intermediate forms, or the like. The computer-readable medium may include at least any entity or apparatus that can carry computer program code to a photographing apparatus/terminal device, a recording medium, a computer memory, a read-only memory (ROM, Read-Only Memory), a random access memory (RAM, Random Access Memory), an electrical carrier signal, a telecommunications signal, and a software distribution medium, for example, a USB flash drive, a removable hard disk, a magnetic disk, or an optical disk. In some jurisdictions, the computer-readable medium cannot be the electrical carrier signal or the telecommunications signal according to legislation and patent practices.

In the foregoing embodiments, the description of each embodiment has respective focuses. For a part that is not described in detail or recorded in an embodiment, refer to related descriptions in other embodiments.

Persons of ordinary skill in the art may be aware that units, algorithms, and steps in the examples described with reference to embodiments disclosed in this specification can be implemented by electronic hardware or a combination of computer software and electronic hardware. Whether the functions are performed by hardware or software depends on particular applications and design constraint conditions of the technical solutions. Persons skilled in the art may use different methods to implement the described functions for each particular application, but it should not be considered that the implementation goes beyond the scope of this application.

In embodiments provided in this application, it should be understood that the disclosed apparatus/network device and method may be implemented in other manners. For example, the described apparatus/network device embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms. The units described as separate components may or may not be physically separate, and components displayed as units may or may not be physical units. To be specific, the components may be located at one position, or may be distributed on a plurality of network units. Some or all of the units may be selected based on actual requirements to achieve the objectives of the solutions in embodiments. The foregoing embodiments are merely intended to describe the technical solutions of this application, but are not to limit this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of embodiments of this application, and these modifications and replacements shall fall within the protection scope of this application.

What is claimed is:

1. An image processing method, the method performed by at least one processor and comprising:
    converting a red yellow blue (RYB) image into a grid image based on a red green blue (RGB) format;
    generating a first brightness layer of the grid image;
    determining a reference gain compensation array to adjust the first brightness layer;
    obtaining, based on a preset compensation array correspondence, a target gain compensation array that is associated with the reference gain compensation array and based on an RYB format; and
    adjusting a second brightness layer of the RYB image by using the target gain compensation array, to generate a corrected image.

2. The method according to claim 1, wherein before the obtaining the target gain compensation array, the method further comprises:
    obtaining a plurality of training control groups in environments with different brightness, wherein each of the plurality of training control groups comprises at least one first training image based on the RYB format and at least one second training image based on the RGB format;
    generating a first training compensation array of the first training image, and generating a second training compensation array of the second training image;
    using the first training compensation array as an output sample of a backpropagation algorithm network, using the second training compensation array as an input sample of the backpropagation algorithm network, and training the backpropagation algorithm network to obtain a compensation conversion network; and
    inputting each of a plurality of reference gain compensation arrays based on the RGB format to the compensation conversion network, determining a target gain compensation array based on the RYB format and corresponding to each of the plurality of reference gain compensation arrays, and generating the compensation array correspondence.

3. The method according to claim 1, wherein the converting the RYB image into the grid image comprises:
    dividing the RYB image into a plurality of grid areas, and determining a feature pixel value of each grid area of the plurality of grid areas based on a pixel in the grid area;
    generating a down-sampled image of the RYB image based on the feature pixel value of each of the plurality of grid areas; and
    converting, by using an RGB conversion algorithm, the down-sampled image into the grid image based on the RGB format.

4. The method according to claim 3, wherein the converting the down-sampled image into the grid image comprises:
    determining, based on a pixel value of each of a plurality of pixels in the RYB image, a light source type used when the RYB image is collected;
    selecting the RGB conversion algorithm matching the light source type; and
    converting, by using the RGB conversion algorithm, the down-sampled image into the grid image based on the RGB format.

5. The method according to claim 1, wherein the adjusting the second brightness layer of the RYB image to generate the corrected image comprises:
    obtaining an image size of the RYB image;
    extending, by using a bilinear interpolation algorithm, the target gain compensation array to an extended gain compensation array having the same image size as the RYB image; and
    adjusting each of a plurality of brightness values at the second brightness layer by using a corresponding compensation coefficient among a plurality of compensation coefficients in the extended gain compensation array, to obtain the corrected image.

6. The method according to claim 1, wherein the generating the first brightness layer of the grid image comprises:
    obtaining a pixel value of a central grid area among a plurality of grid areas of the grid image;
    performing normalization processing on a feature pixel value of each grid area among the plurality of grid areas in the grid image based on the pixel value of the central grid area to obtain a normalized pixel value of the grid area;
    generating, based on a ratio of an R-channel value to a G-channel value of the normalized pixel value of each grid area among the plurality of grid areas, an R/G layer corresponding to the grid image;
    generating, based on a ratio of a B-channel value to the G-channel value of the normalized pixel value of each grid area among the plurality of grid areas, a B/G layer corresponding to the grid image; and
    identifying the R/G layer and the B/G layer as the first brightness layer.

7. The method according to claim 1, wherein the determining the reference gain compensation array comprises:
    for each candidate gain compensation array in a gain compensation set of candidate gain compensation arrays,
        adjusting the first brightness layer by using the candidate gain compensation array, to obtain a brightness calibration layer corresponding to the candidate gain compensation array; and
        determining a smoothing coefficient of the candidate gain compensation array based on a brightness value of each pixel of a plurality of pixels at the brightness calibration layer; and
    selecting, among the candidate gain compensation arrays in the gain compensation set, a candidate gain compensation array with a largest smoothing coefficient as the reference gain compensation array.

8. A terminal, comprising a memory, a processor, and a computer program that is stored in the memory and that, when executed on the processor, causes the processor to implement:
    converting a red yellow blue (RYB) image into a grid image based on a red green blue (RGB) format;
    generating a first brightness layer of the grid image;
    determining a reference gain compensation array to adjust the first brightness layer;
    obtaining, based on a preset compensation array correspondence, a target gain compensation array that is associated with the reference gain compensation array and based on an RYB format; and adjusting a second brightness layer of the RYB image by using the target gain compensation array, to generate a corrected image.

9. The terminal according to claim 8, wherein the computer program, when executed, further causes the processor to implement:
obtaining a plurality of training control groups in environments with different brightness, wherein each of the plurality of training control group comprises at least one first training image based on the RYB format and at least one second training image based on the RGB format;
generating a first training compensation array of the first training image, and generating a second training compensation array of the second training image;
using the first training compensation array as an output sample of a backpropagation algorithm network, using the second training compensation array as an input sample of the backpropagation algorithm network, and training the backpropagation algorithm network to obtain a compensation conversion network; and
inputting each of a plurality of reference gain compensation arrays based on the RGB format to the compensation conversion network, determining a target gain compensation array based on the RYB format and corresponding to each of the plurality of reference gain compensation arrays, and generating the compensation array correspondence.

10. The terminal according to claim 8, wherein the computer program, when executed, further causes the processor to implement:
dividing the RYB image into a plurality of grid areas, and determining a feature pixel value of each grid area of the plurality of grid areas based on a pixel in the grid area;
generating a down-sampled image of the RYB image based on the feature pixel value of each of the plurality of grid areas; and
converting, by using an RGB conversion algorithm, the down-sampled image into the grid image based on the RGB format.

11. The terminal according to claim 10, wherein the computer program, when executed, further causes the processor to implement:
determining, based on a pixel value of each of a plurality of pixels in the RYB image, a light source type used when the RYB image is collected;
selecting the RGB conversion algorithm matching the light source type; and
converting, by using the RGB conversion algorithm, the down-sampled image into the grid image based on the RGB format.

12. The terminal according to claim 8, wherein the computer program, when executed, further causes the processor to implement:
obtaining an image size of the RYB image;
extending, by using a bilinear interpolation algorithm, the target gain compensation array to an extended gain compensation array having the same image size as the RYB image; and
adjusting each of a plurality of brightness values at the second brightness layer by using a corresponding compensation coefficient among a plurality of compensation coefficients in the extended gain compensation array, to obtain the corrected image.

13. The terminal according to claim 8, wherein the computer program, when executed, further causes the processor to implement:
obtaining a pixel value of a central grid area among a plurality of grid areas of the grid image;
performing normalization processing on a feature pixel value of each grid area among the plurality of grid areas in the grid image based on the pixel value of the central grid area to obtain a normalized pixel value of the grid area;
generating, based on a ratio of an R-channel value to a G-channel value of the normalized pixel value of each grid area among the plurality of grid areas, an R/G layer corresponding to the grid image;
generating, based on a ratio of a B-channel value to the G-channel value of the normalized pixel value of each grid area among the plurality of grid areas, a B/G layer corresponding to the grid image; and
identifying the R/G layer and the B/G layer as the first brightness layer.

14. The terminal according to claim 8, wherein the computer program, when executed, further causes the processor to implement:
for each candidate gain compensation array in a gain compensation set of candidate gain compensation arrays,
adjusting the first brightness layer by using the candidate gain compensation array, to obtain a brightness calibration layer corresponding to the candidate gain compensation array; and
determining a smoothing coefficient of the candidate gain compensation array based on a brightness value of each pixel of a plurality of pixels at the brightness calibration layer; and
selecting, among the candidate gain compensation arrays in the gain compensation set, a candidate gain compensation array with a largest smoothing coefficient as the reference gain compensation array.

15. An image processing method, the method performed by at least one processor and comprising:
obtaining a red yellow blue (RYB) image;
converting the RYB image into a grid image based on a red green blue (RGB) format;
generating a first brightness layer of the grid image;
determining a reference gain compensation array to adjust the first brightness layer;
obtaining a target gain compensation array that is associated with the reference gain compensation array and based on an RYB format;
adjusting a second brightness layer of the RYB image by using the target gain compensation array; and
generating a corrected image.

16. The method according to claim 15, wherein,
the RYB image is generated by a RYYB image sensor.

17. The method according to claim 15, wherein,
the RYB image is generated by a camera with an infrared filter.

18. The method according to claim 15, wherein,
the first brightness layer of the grid image is generated by a transforming algorithm of the RGB format and a hue saturation value (HSV) format.

19. The method according to claim 15, wherein,
the reference gain compensation array is based on the RGB format.

* * * * *